(12) United States Patent  
Luyten et al.

(10) Patent No.: US 7,859,967 B2  
(45) Date of Patent: Dec. 28, 2010

(54) OPTICAL DISK DRIVE WITH SPHERICAL ABERRATION MEASUREMENT AND METHOD OF MEASURING SPHERICAL ABERRATION IN AN OPTICAL DISK DRIVE

(75) Inventors: Geert Luyten, Averbode (BE); Maarten Kuijper, Helmond (NL); Alberto Martin-Consuegra Granados, Eindhoven (NL)

(73) Assignee: Lite-On It Corporation, Taipei (TW)

( * ) Notice: Subject to any disclaimer, the term of this patent is extended or adjusted under 35 U.S.C. 154(b) by 692 days.

(21) Appl. No.: 11/847,522

(22) Filed: Aug. 30, 2007

(65) Prior Publication Data

US 2009/0059742 A1    Mar. 5, 2009

(51) Int. Cl.  
*G11B 7/00*   (2006.01)

(52) U.S. Cl. ............... 369/53.28; 369/44.23; 369/53.31

(58) Field of Classification Search ........................ None  
See application file for complete search history.

(56) References Cited

U.S. PATENT DOCUMENTS

2007/0064558 A1* 3/2007 Hoshi ..................... 369/47.26  
2008/0056077 A1* 3/2008 Miyaoka ................. 369/44.23

* cited by examiner

*Primary Examiner*—Wayne R Young  
*Assistant Examiner*—Brian Butcher  
(74) *Attorney, Agent, or Firm*—WPAT, PC; Justin King

(57) ABSTRACT

The invention relates to an optical disk drive. The optical disk drive has an objective lens to be driven by a focus actuator with a focus offset for focusing an incident beam onto an optical disk into a spot with a spherical aberration, and a processor to derive a first and a second characteristic from a sensor output signal and obtain a spherical aberration correction value (SA) from a pre-determined function, the pre-determined function defining a spherical aberration correction value in dependence on a focus offset difference value ($\Delta FO$). The focus offset difference value ($\Delta FO$) is determined from a difference between a second optimal focus offset at which the second characteristic is optimal and a first optimal focus offset at which the first characteristic is optimal. The spherical aberration correction value (SA) can be used to achieve a correction to the spherical aberration of the spot.

20 Claims, 15 Drawing Sheets

OPTICAL DISK DRIVE WITH SPHERICAL ABERRATION MEASUREMENT AND METHOD OF MEASURING SPHERICAL ABERRATION IN AN OPTICAL DISK DRIVE

FIELD

The invention relates to an optical disk drive for scanning an optical disk comprising a substantially circular track, the optical disk drive comprising a optical source for generating an incident beam and an objective lens arranged to be driven by a focus actuator with a focus offset, for focusing the incident beam onto said optical disk into a spot with a spherical aberration. The invention further relates to a method for deriving a spherical aberration correction value for use with an optical disk drive.

BACKGROUND

Such a optical disk drive is known from published patent application WO 2005/034100 A2. WO 2005/034100 A2 discloses a method of determining the setting of a spherical aberration correction to be applied to an optical beam in an apparatus for reading data from and/or writing data onto an optical data carrier, especially a BluRay disk or a HD-DVD disk. An incident beam is generated and focused onto the optical data carrier so as to produce a reflected beam. A spherical aberration correction is applied to the incident beam. A difference signal, which results from a difference between the intensities of two substantially symmetrical portions of the reflected beam, for example the radial push pull signal (PP) or the radial wobble signal, is measured during a relative movement between the incident beam and the optical data carrier. A specific setting (VO) of the spherical aberration correction, which maximizes the amplitude of the difference signal, is determined. Such a measurement will be referred to as a one-dimensional (1D) measurement as the value of one characteristic—e.g., a radial error signal—is measured as a function of a plurality of values of one parameter—i.e., collimator position or, equivalently, spherical aberration correction—. A problem of this prior art is that the quality of the obtained spherical aberration correction, although resulting in a large amplitude of the difference signal, is not always optimal for reading from and/or writing data on the disk.

Another such optical disk drive is described in the yet unpublished U.S. patent application Ser. No. 11/755,552 of the same applicant. U.S. patent application Ser. No. 11/755,552 describes an optical reading/writing apparatus having an optical head that includes a collimator and an objective lens. For focusing control, a start-up procedure is executed to generate a first start-up S-curve. A boundary is then set according to the start-up S-curve. After executing focusing on and tracking on, a plurality of position combinations of the collimator and the objective lens are selected for focusing calibration, thereby obtaining respective focusing error signals. By comparing the focusing error signals with the boundary, whether the position combinations of the selected collimator and the objective lens are valid can be determined. One of the valid position combinations with the greatest image-quality value is then selected to read/write the optical disc in the subsequent reading/writing procedure. Such as measurement will be referred to as a two-dimensional (2D) measurement as the value of one characteristic—i.e., image-quality—as a function of a plurality of combinations of two parameters—i.e., collimator position and objective lens position, or equivalently, spherical aberration correction and focus offset—, in which both parameters are varied. A problem of this prior art is that the quality of the selected combination of objective lens position (for focus offset) and collimator position (for spherical aberration correction) is not always optimal. When applied to a large number of optical disks in a large number of optical drives, it was found that the greatest image-quality based on the measurement of one parameter, e.g., the wobble amplitude, did not always correspond to the greatest image-quality based on measurements of another parameter, e.g., data jitter. This could result in, e.g., a selected combination with a good data jitter allowing to retrieve the written data well, but with a poor wobble amplitude, resulting in a poor recovery of the position along the track. This could result in, e.g., a selected combination with a good data jitter allowing to retrieve the written data well, but with a poor radial error signal, resulting in non-stable tracking performance. It was also found that it is sometimes very difficult to determine the image quality, as the measurements are sometimes difficult to analyse, e.g., difficult to fit with a function. It was also found that the procedure can take a considerable time, as the procedure requires to measure a relatively large number of objective lens positions for a relatively large number of collimator positions. Although the variation of the objective lens position can be done relatively fast, the variation of the collimator position takes a more significant amount of time. Hence, it would be advantageous to have a procedure which requires no, or only a limited number of, collimator position variations. It would also be advantageous to have a procedure which generally only needs to vary one position, preferably the position of the objective lens.

SUMMARY

The present invention aims to provide an optical disk drive which can derive an optimal spherical aberration correction value after receiving an optical disk. The present invention also aims to provide a method for deriving a spherical aberration correction value for use with an optical disk drive.

Hereto the optical disk drive according to the present invention comprises
 a sensor for sensing a reflected beam produced by said optical disk upon receiving said incident beam, and for producing a sensor output signal,
 a processor arranged to:
  receive said sensor output signal from said sensor,
  derive at least a first and a second characteristic from said sensor output signal, the second characteristic being different from the first characteristic,
  determine first values of the first characteristic as a function of a plurality of values of the focus offset,
  determine second values of the second characteristic as a function of a plurality of values of the focus offset,
  derive from said first values of the first characteristic and said second values of the second characteristic a first spherical aberration correction value.

The first and second characteristic may be quality measures of the sensor output signal or a signal generated from the sensor output signal. The quality of a signal will depend on the value of the focus offset. As the two characteristics are different from each other, their dependence on the value of the focus offset will also be different. The difference in this dependence can be indicative for the spherical aberration of the spot, and hence of a spherical aberration correction value which corresponds to a spot of an optimal quality.

The inventors have come to the insight that this difference in dependence on focus offset can be used to derive the spherical aberration correction value, without actually applying a spherical aberration correction to the focused spot. This is advantageous when comparing to the prior art where both the focus offset as well as the spherical aberration correction to the focused spot are varied.

The sensor may, e.g., comprise four segments to detect the intensities of four parts of the reflected beam. The sensor output signal may, e.g., comprise four channels, corresponding to the intensities of each of the respective four segments.

The first characteristic from said sensor output signal may, e.g., be a push-pull amplitude measured from a radial error signal generated from said sensor output signal. The second characteristic from said sensor output signal may, e.g., be a jitter measured from a data signal generated from said sensor output signal.

The person skilled in the art will understand that the functions performed by the processor may as well be distributed over multiple functional units, such as a preprocessor and a processor, and that the functions may as well be implemented in hardware blocks as in software blocks on a programmable processor.

In order to derive the first spherical aberration correction value, the processor may be arranged to:
   determine from said first values a first optimal focus offset at which the first characteristic is optimal,
   determine from said second values a second optimal focus offset at which the second characteristic is optimal,
   obtain the first spherical aberration correction value from a pre-determined function, the pre-determined function defining a spherical aberration correction value in dependence on a focus offset difference value, the focus offset difference value being determined from a difference between the second optimal focus offset and the first optimal focus offset.

The first optimal focus offset, FO1, is thus determined from a one-dimensional measurement of the values of the first characteristic as a function of focus offset. As an example, the first optimal focus offset may be a value of the focus offset at which the radial push-pull signal has the largest amplitude. The first optimal focus offset may be determined from fitting the measurement with a smooth curve, e.g., a second order polynomial, and determined to be the optimum of the fitted curve. The first optimal focus offset may also be the value of the focus offset corresponding to the measurement point with the largest push-pull signal.

The second optimal focus offset, FO2, is thus determined from a one-dimensional measurement of the values of the second characteristic as a function of focus offset. This measurement can be done while the measurement of the first values is done, at the same focus offset values, or separately. As an example, the second optimal focus offset may be a value of the focus offset at which the data signal has the lowest jitter.

The first and second optimal focus offsets will generally be different values. If they would accidentally be the same, they correspond to the optimal focus offset value and the spherical aberration of the spot is optimal.

A first spherical aberration correction value is obtained from a pre-determined function $fSphC(\Delta FO)$ of the difference between the second and the first optimal focus offset, $\Delta FO = FO2 - FO1$. The function may be a linear function $fSphC(\Delta FO) = \alpha \cdot \Delta FO + \beta$, with $\alpha$ being a constant, e.g., determined during a factory calibration of the drive, and $\beta$ typically zero.

It is thus possible to obtained a spherical aberration correction value by only varying the focus offset, without having to change the spherical aberration of the spot.

The optical disk drive according to the invention may further comprise a spherical aberration correction element arranged to be driven by a spherical aberration correction actuator with a spherical aberration correction value, for applying a correction to the incident beam for obtaining a spherical aberration correction to the spherical aberration of the spot.

The spherical aberration resulting from a different thickness of the optical disk can thus be compensated for. Various arrangements are known in the art for such a spherical aberration correction element.

In a further embodiment, the spherical aberration correction element comprises one or more lens elements for changing a degree of collimation of the incident beam towards the objective lens, and the spherical aberration correction actuator is arranged to actuate the position of at least one lens element for changing the degree of collimation of the incident beam towards the objective lens or towards the disk.

One embodiment comprises an actuated collimator lens in the divergent incident beam which can move along the optical axis of the incident beam. A change in its position results in a change of the degree of convergence or divergence of the incident beam, which results in spherical aberration of the focussed spot. Also an actuated telescope may be used in which the position of one of the lens elements is changed in order to change the degree of collimation of the incident beam towards the objective lens, or an actuated dual-objective lens arrangement to change the degree of collimation of the incident focusing beam towards the objective disk.

Alternatively, an actuated liquid crystal lens can be used. Such an actuated liquid crystal lens may not have any moving components, but have a variable effective optical strength due to the difference in refractive index between the two polarizations. Actuating such a liquid crystal lens is done by driving with a voltage or a current, of which the magnitude determines how much the effective strength of the lens is varied.

In a further embodiment, the spherical aberration correction controller is arranged to apply the first spherical aberration correction value to the spherical aberration correction actuator.

The spherical aberration correction element is thus driven for applying a correction to the incident beam for obtaining a spherical aberration correction to the spherical aberration of the spot. This improves the quality of the spot.

In a further embodiment,
   the processor is arranged to:
      repeat the determination of the first optimal focus offset and the determination of the second optimal focus offset when the first spherical aberration correction value is applied to the spherical aberration correction actuator,
      obtain a second spherical aberration correction value from said pre-determined function, and
   the spherical aberration correction controller is arranged to apply the second spherical aberration correction value to the spherical aberration correction actuator.

E.g., when the first and second optimal focus offset differ significantly and the resulting first spherical aberration correction value is large, it may be possible to improve the determination of the optimal spherical aberration correction value by repeating the measurement while the first spherical aberration correction value is applied, i.e., with an improved spot quality compared to the condition used when the first spherical aberration correction value was obtained. The newly obtained first and second optimal focus offsets will then differ less and the second spherical aberration correction value will be improved compared to the first spherical aberration correction value.

The procedure may be repeated as long as the newly obtained first and second optimal focus offsets continue to differ significantly while applying the newly obtained spherical aberration correction value during each next repetition.

In a further embodiment,
the processor is arranged to select a third optimal focus offset from a range between the first optimal focus offset and the second optimal focus offset, and
the focus actuator is arranged to drive the objective lens with the third optimal focus offset.

This obtains also a focus offset resulting in a good spot quality, to be used in further operation with the optical disk.

The third optimal focus offset, FO3, may be determined as a weighted average of the first optimal focus offset, FO1, and the second optimal focus offset, FO2, as FO3=w1·FO1+ w2·FO2. Herein, w1 and w2 are factors in the range of 0% to 100%, with w1+w2=100%.

The weighted average provides the best estimate for the focus offset with the best spot quality. The weights may be fixed and pre-determined. The weights may be equal, w1=w2=50% to achieve a third optimal focus offset as the average of the first and second optimal focus offset. Alternatively, the weights may be different. E.g., w1 may be 30% and w2 may be 70%, to achieve a third optimal focus offset which is closer to the second optimal focus offset FO2 than to the first optimal focus offset FO1.

In an embodiment, the focus actuator is arranged to drive the objective lens with the focus offset in dependence on an actual condition, such as the position on the disk and the temperature.

Although the third optimal focus offset and obtained spherical aberration correction value were optimal during the measurement from which they were derived, they might not be optimal for another position on the disk or at a later moment in time. E.g., the disk may have a slightly different thickness at a different location resulting in some deterioration of the spot quality. Also, the temperature in the optical disk drive may have increased during operation. These effects can be largely compensated for when the focus offset is adjusted depending on the position of the disk or, e.g., temperature.

For this purpose, the processor may be arranged to:
derive a third characteristic from said sensor output signal,
determine third values of the third characteristic as a function of a plurality of values of the focus offset,
determine from said third values a local optimal focus offset at which the third characteristic is optimal,
the focus actuator is arranged to drive the objective lens with the local optimal focus offset.

The processor thus performs a single additional one-dimensional measurement of a third characteristic as a function of focus offset to obtain the local optimal focus offset. The third characteristic may, e.g., be jitter of the data signal, or a push-pull amplitude of the radial error signal when there is no data yet on this location on the disk.

In an embodiment, the spherical aberration correction controller is arranged to apply the obtained spherical aberration correction value to the spherical aberration correction actuator for a plurality of (radial) positions on the disk.

I.e., the spherical aberration correction value is only obtained at one position of the disk and used for all positions on the same layer on the disk. The inventors have found that the method results in a spherical aberration correction value which does not need to be adjusted. Moreover, when a local optimal focus offset as described above is applied, the differences in thickness variation of the disk are largely compensated for.

In an embodiment,
the processor is arranged to:
derive a calibration characteristic from said sensor output signal,
determine calibration values of the calibration characteristic as a function of a plurality of spherical aberration correction values and a plurality of values of the focus offset,
determine from said calibration values an initial spherical aberration correction value and an initial focus offset at which the calibration characteristic is optimal, and
the spherical aberration correction controller is arranged to apply the initial spherical aberration correction value to the spherical aberration correction actuator.

This procedure will further be referred to as a pre-calibration. The pre-calibration may be used to be able to determine an initial spherical aberration correction value and an initial focus offset based on the measurement of a single characteristic, i.e., the calibration characteristic. A two-dimensional measurement of the values of the calibration characteristic as a function of spherical aberration correction and the focus offset may be done with a limited number of values for the spherical aberration correction and the focus offset to get a rough starting point for the spherical aberration correction and the focus offset when applying, which are subsequently applied during the procedure to obtain the first spherical aberration correction. Due to the limited number of values, the time needed for this pre-calibration is still reasonably short. The calibration characteristic may, e.g., be a quality measure of a signal that is available from both empty as well as written disks, such as the push-pull amplitude or the wobble amplitude. When the disk already contains data, the calibration characteristic may alternatively be, e.g., a quality measure of the data signal, such as jitter.

In a further embodiment, the processor is further arranged to:
write data onto a portion of the track when the initial spherical aberration correction value is applied to the spherical aberration correction actuator and the focus actuator is arranged to drive the objective lens with the initial focus offset, and
use said portion of the track in order to determine the first values of the first characteristic and the second values of the second characteristic, which are used to derive the first spherical aberration correction value.

When the optical disk drive receives an empty disk, the drive may thus first use the pre-calibration using, e.g., the wobble amplitude as the quality measure, in order to obtain an the initial spherical aberration correction value and the initial focus offset. At this stage, the optical disk drive may also optimize the laser power in a so-called optical power calibration procedure when the initial spherical aberration correction value and the initial focus offset are applied. The optical disk drive then writes data on the disk while applying the initial spherical aberration correction value and the initial focus offset together with optimal power. The optical spot will generally be of a sufficient quality to write data with a sufficient quality for further optimization of the spherical aberration correction value. The part of the disk with the written data is then used while obtaining the first, and optionally the second, spherical aberration correction value and the third optimal focus offset. Both radial error signal related quality measures as well as data quality measures may be obtained using this part of the disk.

While determining first values of the first characteristic and second values of the second characteristic, the processor might find that these values have a too low quality, e.g., that the data jitter is always above a certain limit of, e.g., 15% of a retrieved clock period. The data quality may then be insufficient to obtain a reliable determination of the spherical aberration correction value. For this purpose, the processor may be arranged to:

write new data onto the disk when the obtained (first or second) spherical aberration correction value is applied to the spherical aberration correction actuator, if the processor measured at least one of the first characteristic and the second characteristic to be outside a limit, repeat the determination of the first optimal focus offset and the determination of the second optimal focus offset when the obtained (first or second) spherical aberration correction value is applied to the spherical aberration correction actuator and using the newly written data, obtain a third spherical aberration correction value from said pre-determined function, and the spherical aberration correction controller may be arranged to apply the third spherical aberration correction value to the spherical aberration correction actuator.

Optical disks may also comprise more than one layer. In such a multi-layer disk, the layers are separated by a transparent spacer, which introduces a different spherical aberration for each layer that the spot can be focused on. To handle these multi-layer disks well, the controller may be arranged to:

determine the number of layers of the optical disk in the optical disk drive and to select on which of the layers the incident beam is focused, determine the first optimal focus offset and the second optimal focus offset on each of the layers of the optical disk separately, obtain respective spherical aberration correction values for each of the layers individually from said pre-determined function, and the spherical aberration correction controller may be arranged to apply the respective spherical aberration correction value to the spherical aberration correction actuator when the incident beam is focused on the corresponding layer.

Hence, the spherical aberration correction value is different for each layer, while it may be constant within a layer.

The first, second, third and calibration characteristics may be chosen from a wide range of signal characteristics. Preferably, the first and second characteristics are selected to relate to two different aspects of optical disk performance, e.g., to the tracking performance and to the data performance.

In an embodiment, the first characteristic is a radial error signal characteristic. The first characteristic may be a signal quality of a radial error signal, the radial error signal being selected from a group of a push-pull signal, a wobble signal, track-cross signal. Preferably, the first characteristic is a first signal quality selected from a group of push-pull signal amplitude, a wobble signal amplitude and a track-cross signal amplitude.

In an embodiment, the second characteristic is a data signal characteristic. The second characteristic may be a signal quality of a data signal. Preferably, the second characteristic is selected from a group of jitter, asymmetry, modulation, error rate, signal-to-noise ratio (SNR), partial-response signal-to-noise ratio (PRSNR) and Sequenced Amplitude Margin (SAM).

The third characteristic is preferably relating to the data performance. In an embodiment, the third characteristic is a third signal quality of a data signal. The third characteristic may be selected from a group of jitter, asymmetry, modulation, error rate, SNR, PRSNR and SAM.

The fourth characteristic may relate to a signal quality of a signal available on an empty disk, e.g., a quality measure of a radial error signal. It may also relate to data performance when the disk already comprises data.

In an embodiment, the calibration characteristic is a signal quality selected from the group of wobble amplitude, wobble error rate, push-pull amplitude, track-cross signal amplitude, data jitter, data error rate, data modulation depth, data SNR, data PRSNR, data SAM and disk reflectivity.

The optical disk drive may also use one characteristic when the disk is empty and another characteristic when the disk comprises data.

The invention also provides a method for deriving a spherical aberration correction value for use with an optical disk drive for scanning an optical disk comprising a substantially circular track, the optical disk drive comprising:

a optical source for generating an incident beam, an objective lens arranged to be driven by a focus actuator with a focus offset, for focusing the incident beam onto said optical disk into a spot with a spherical aberration, a sensor for sensing a reflected beam produced by said optical disk upon receiving said incident beam, and for producing a sensor output signal, a processor arranged to receive said sensor output signal from said sensor, where in the method comprises:

deriving a first and a second characteristic from said sensor output signal, the second characteristic being different from the first characteristic, determining first values of the first characteristic as a function of a plurality of values of the focus offset, determining second values of the second characteristic as a function of a plurality of values of the focus offset, deriving from said first values of the first characteristic and said second values of the second characteristic the spherical aberration correction value.

The method is reliable and fast. The two one-dimensional measurements of the first values and the second values as a function of focus offset can be done while varying the focus offset once and measuring the values of the two characteristics at each value of the focus offset. The method may be implemented in a single processor or distributed over multiple processors and/or functional units. The method may be implemented in hardware, software or a combination thereof. The method may also be (partly) implemented in a processor outside the optical disk drive, e.g., in the CPU of a computer device cooperating with the optical disk drive.

In an embodiment, in order to derive the spherical aberration correction value, the method comprises:

determining from said first values a first optimal focus offset at which the first characteristic is optimal, determining from said second values a second optimal focus offset at which the second characteristic is optimal, obtaining the spherical aberration correction value from a pre-determined function, the predetermined function defining a spherical aberration correction value from a focus offset difference value, the focus offset difference value determined from a difference between the second optimal focus offset and the first optimal focus offset.

A first characteristic could, e.g., be push-pull amplitude, with largest push-pull being optimal. A second characteristic could, e.g., be jitter, with the lowest jitter being optimal. However, as described above, other characteristics may also be used.

In a further embodiment, the method comprises
applying the spherical aberration correction value to a spherical aberration correction actuator arranged to drive a spherical aberration correction element for applying a correction to the incident beam for obtaining a spherical aberration correction to the spherical aberration of the spot.

The optical disk drive thus scans the optical disk with an optimized spherical aberration correction value.

In a further embodiment, the method comprises, prior to deriving the first and the second characteristic from said sensor output signal,
deriving a calibration characteristic from said sensor output signal,
determining calibration values of the calibration characteristic as a function of a plurality of spherical aberration correction values and a plurality of values of the focus offset,
determining from said calibration values an initial spherical aberration correction value and an initial focus offset at which the calibration characteristic is optimal,
applying the initial spherical aberration correction value to the spherical aberration correction actuator.

This two-dimensional pre-calibration may provide a reasonable setting for initial spherical aberration correction and initial focus offset, in order to, e.g., allow to write with a sufficient quality on a yet empty disk. The calibration characteristic could, e.g., be wobble amplitude on an empty disk or another radial error signal amplitude. However, as described above, other characteristics may also be used.

The invention further provides a computer program product arranged to be loaded in a processor and to perform one of the methods described above.

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
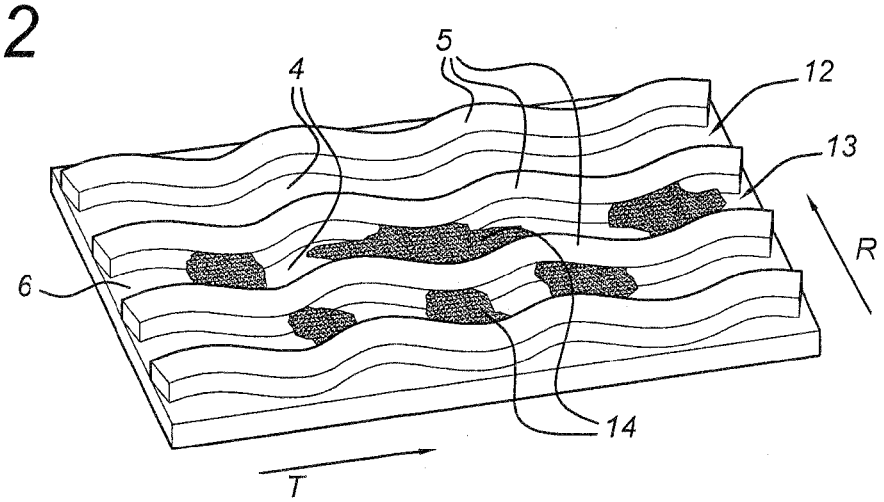
Figure 3:
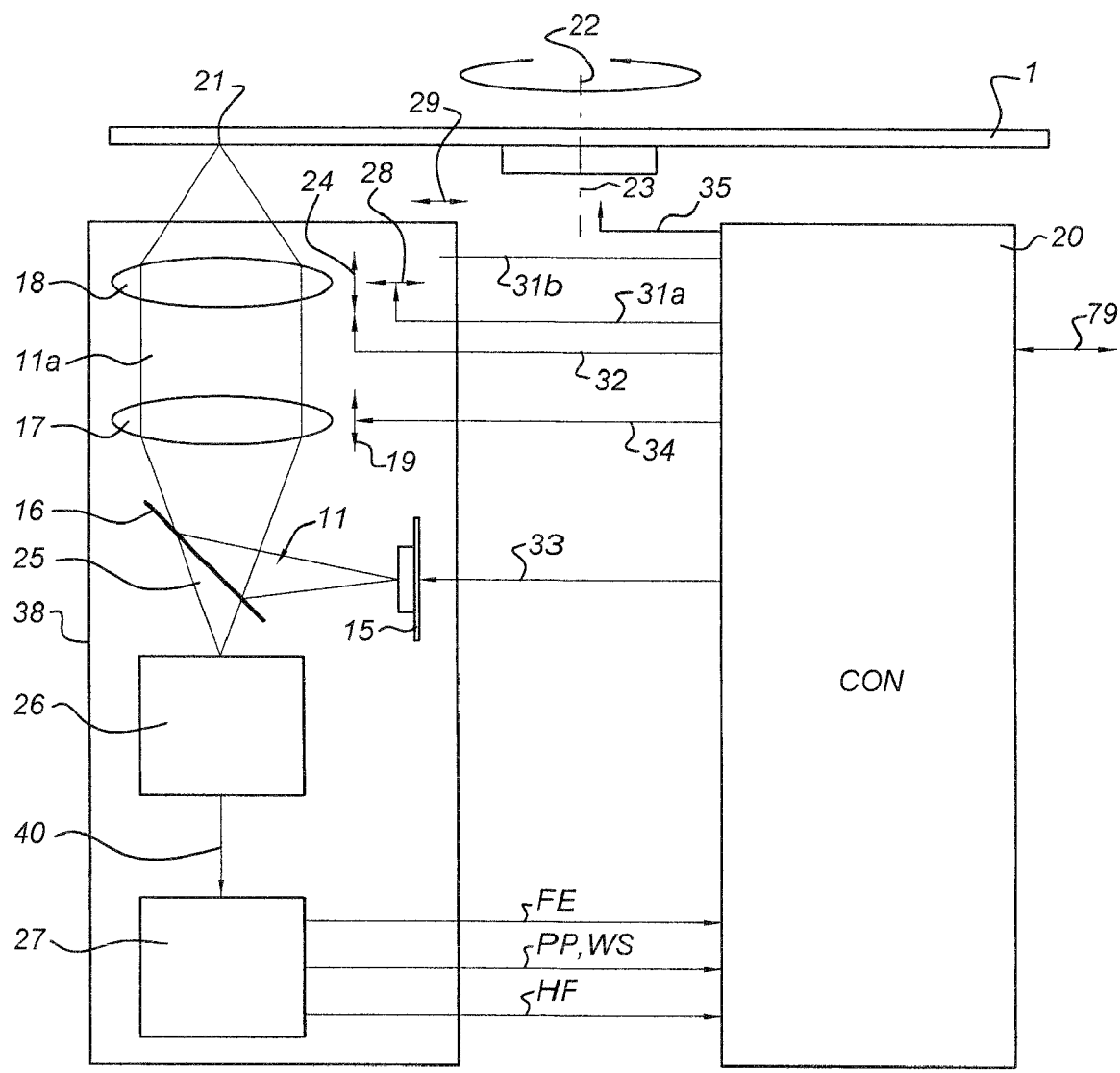
Figure 4:
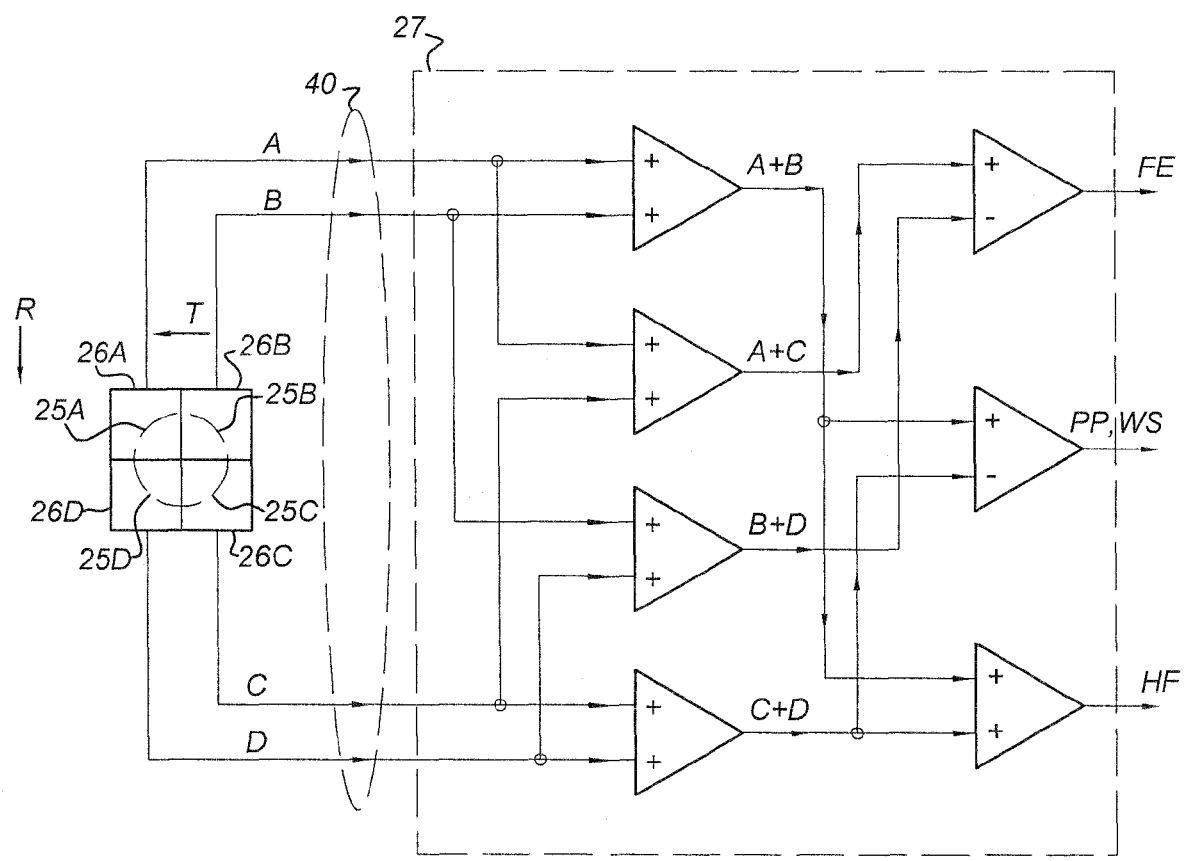
Figure 5:
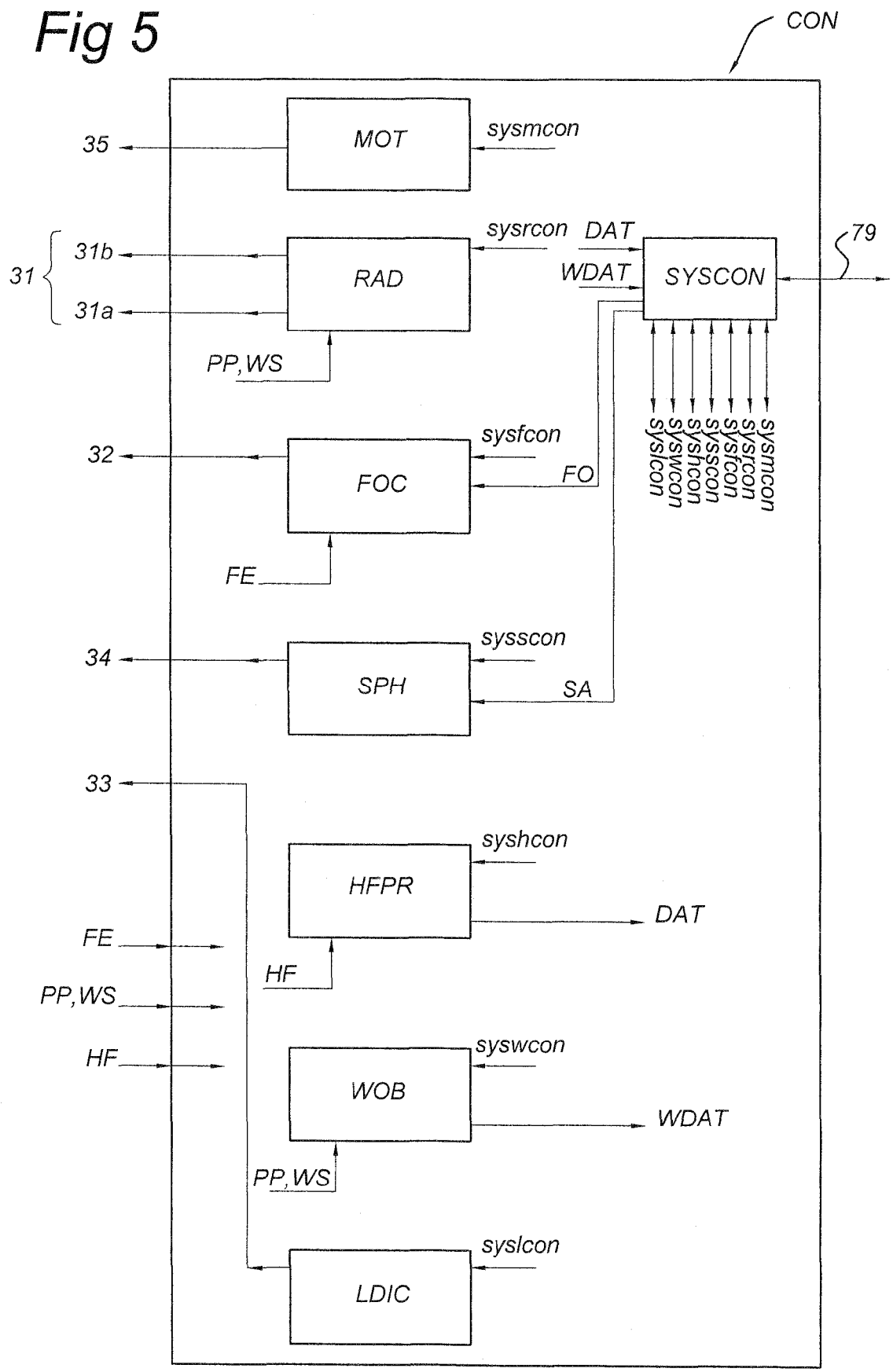
Figure 6A:
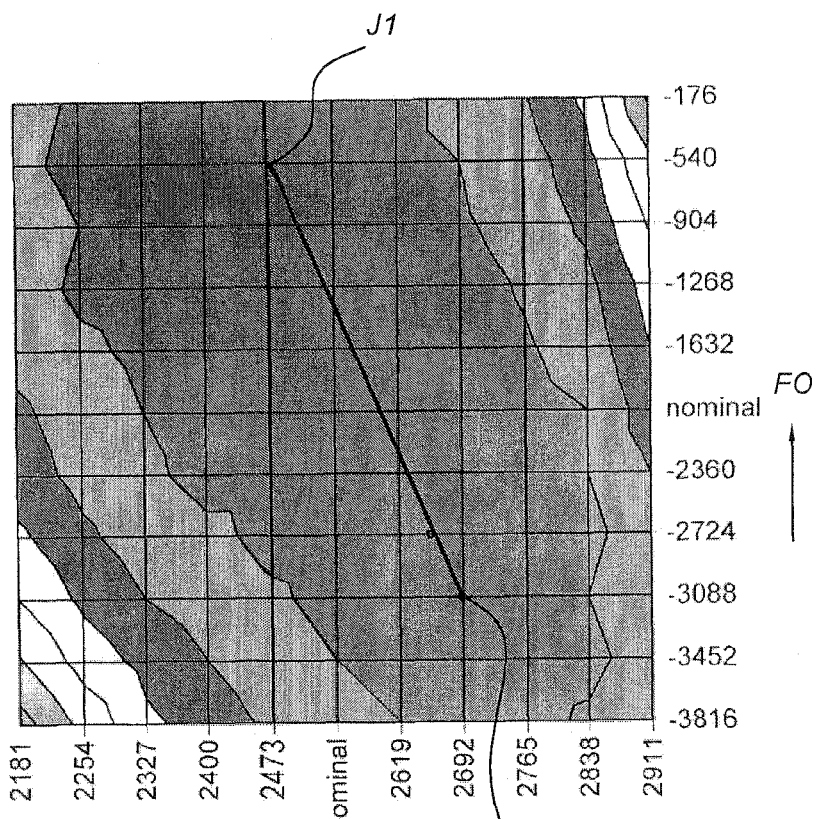
Figure 6B:
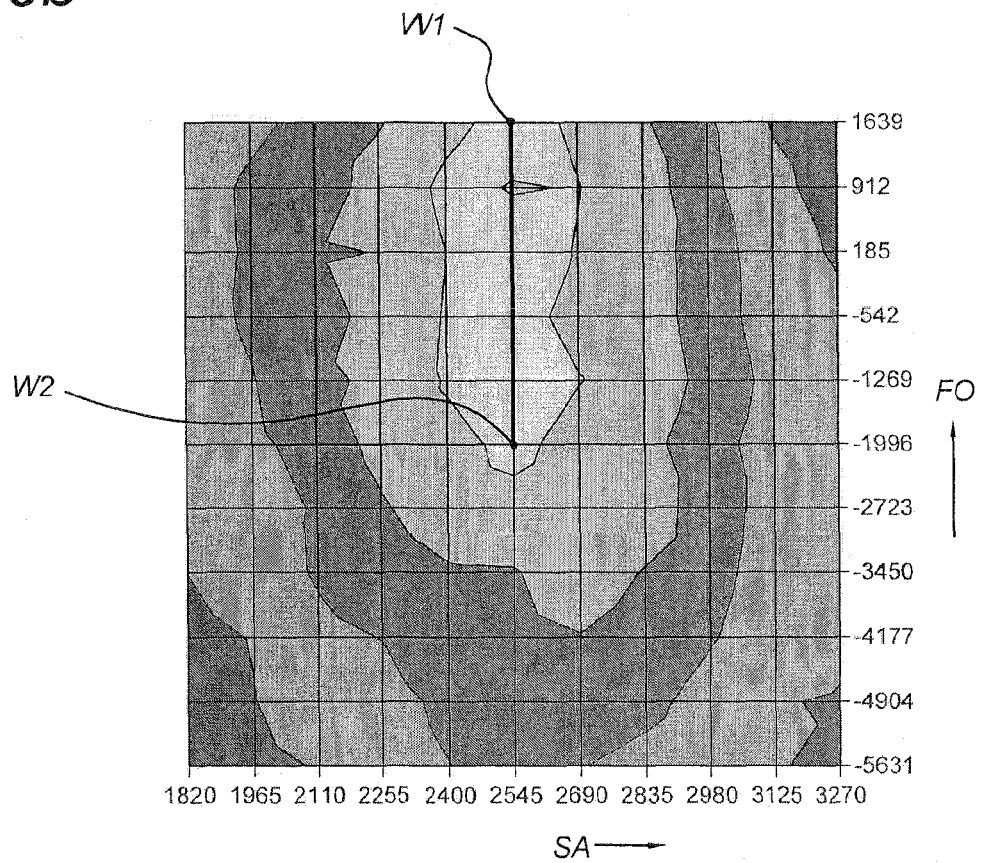
Figure 6C:
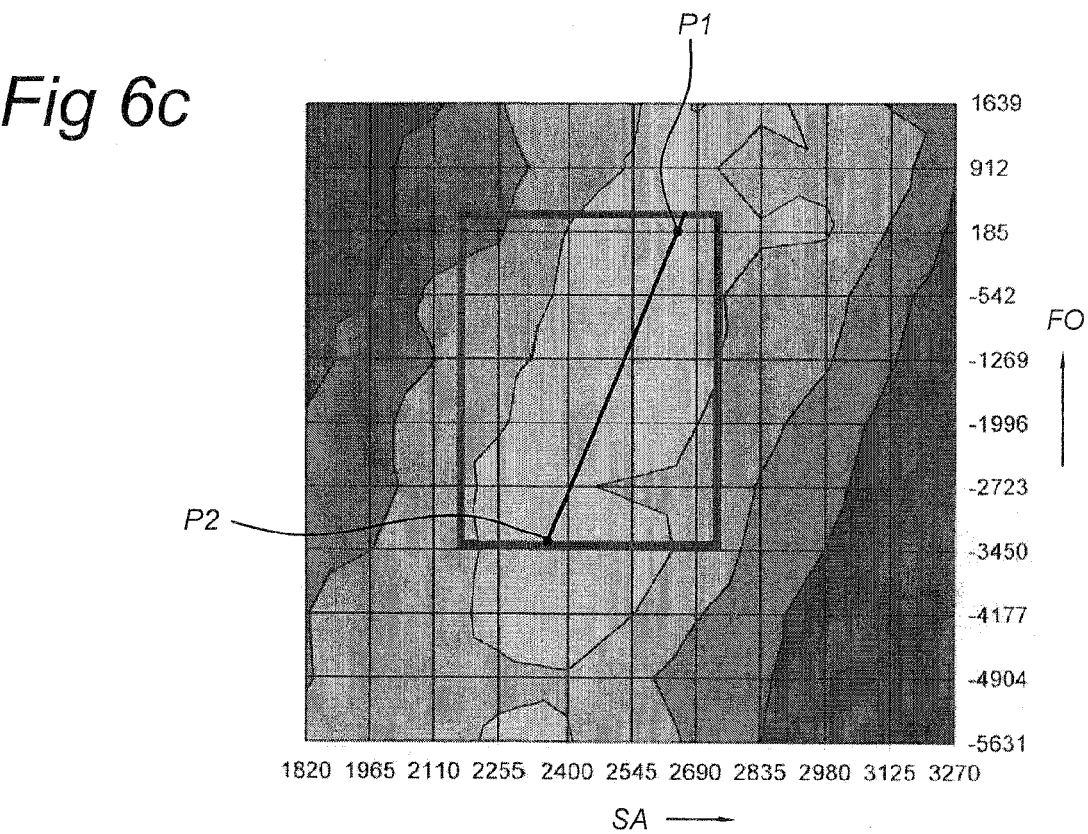
Figure 7:
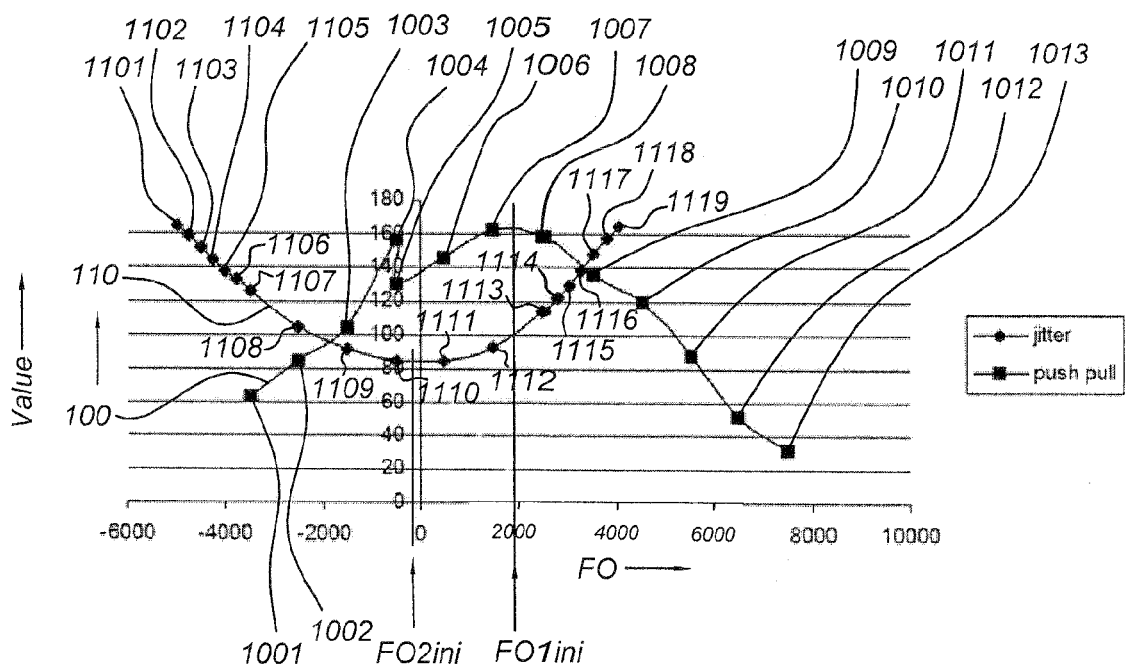
Figure 9:
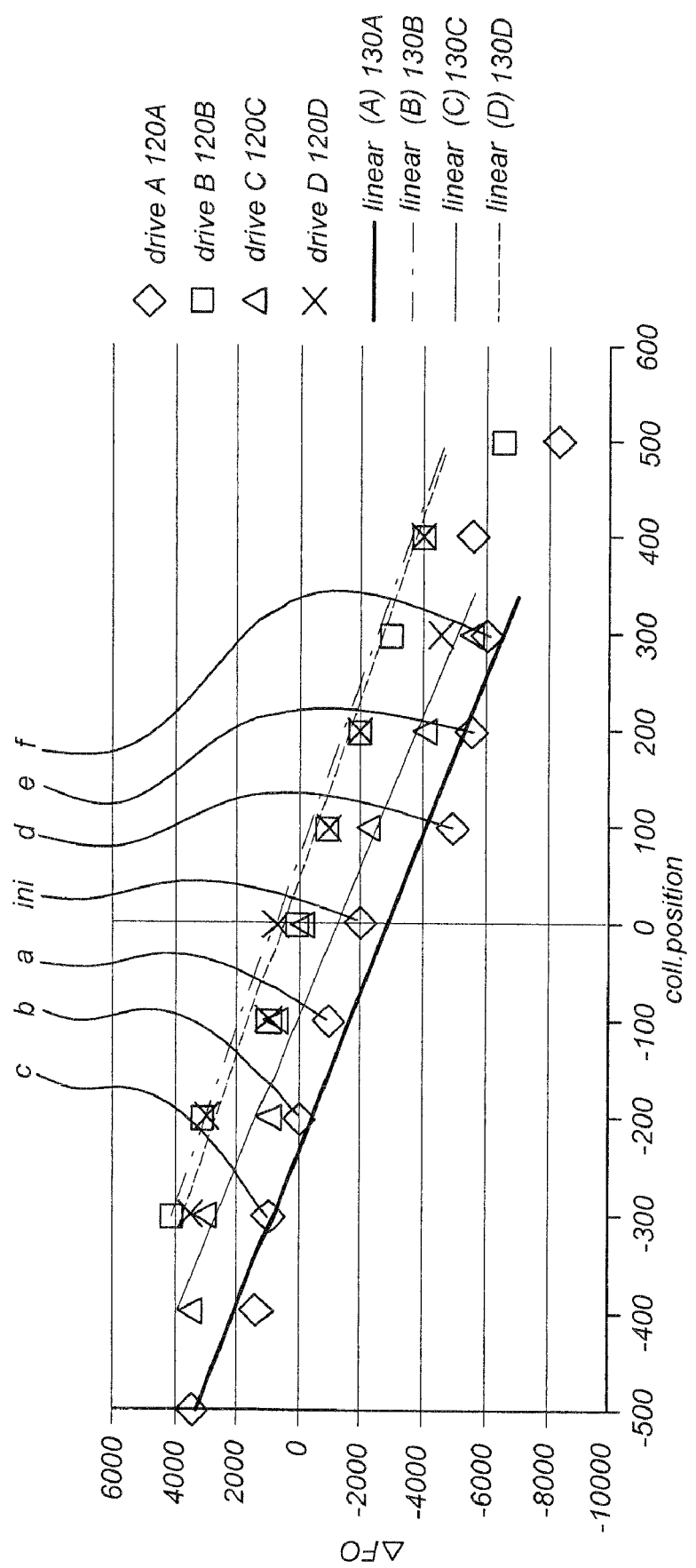
Figure 10:
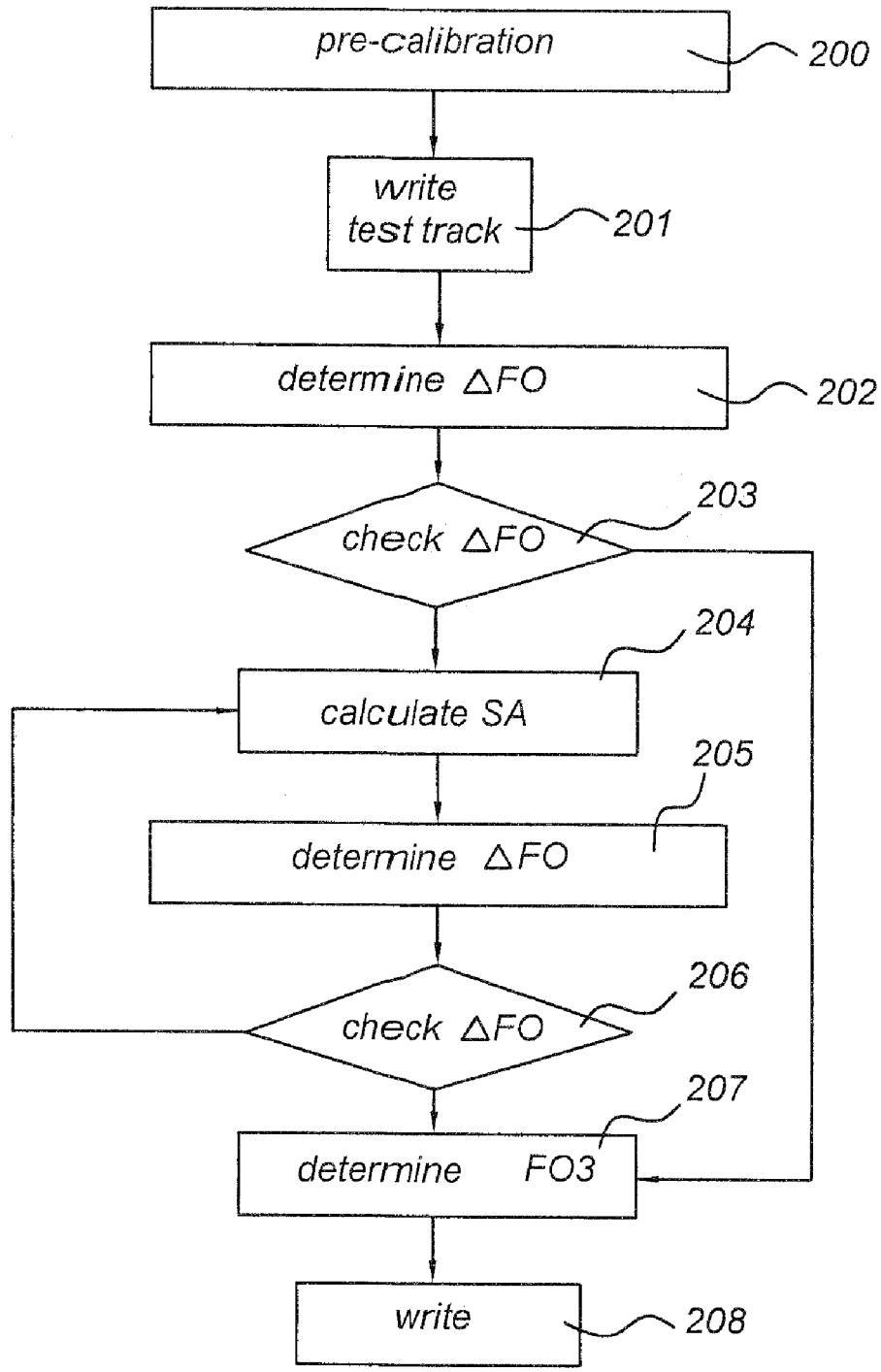
Figure 11:
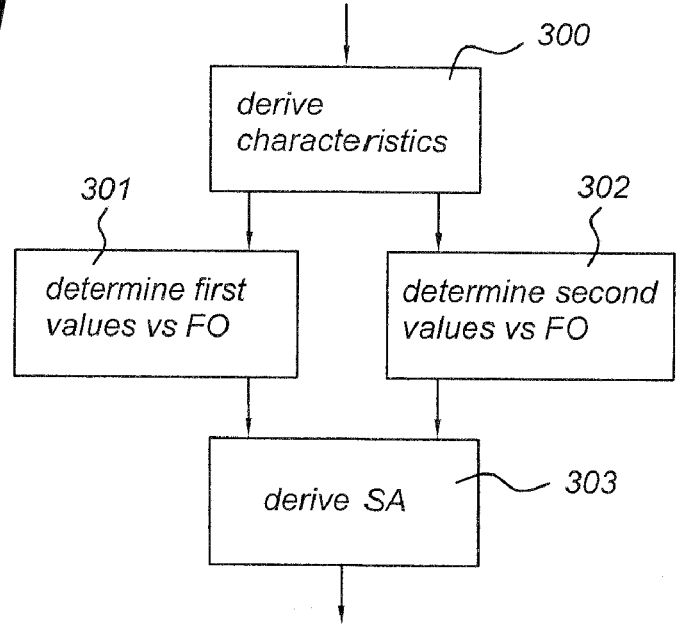
Figure 12:
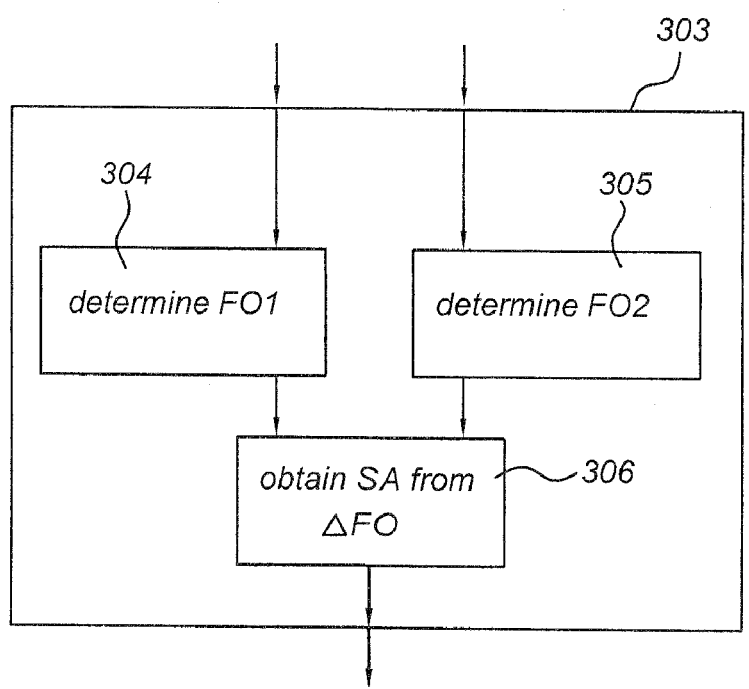
Figure 13A:
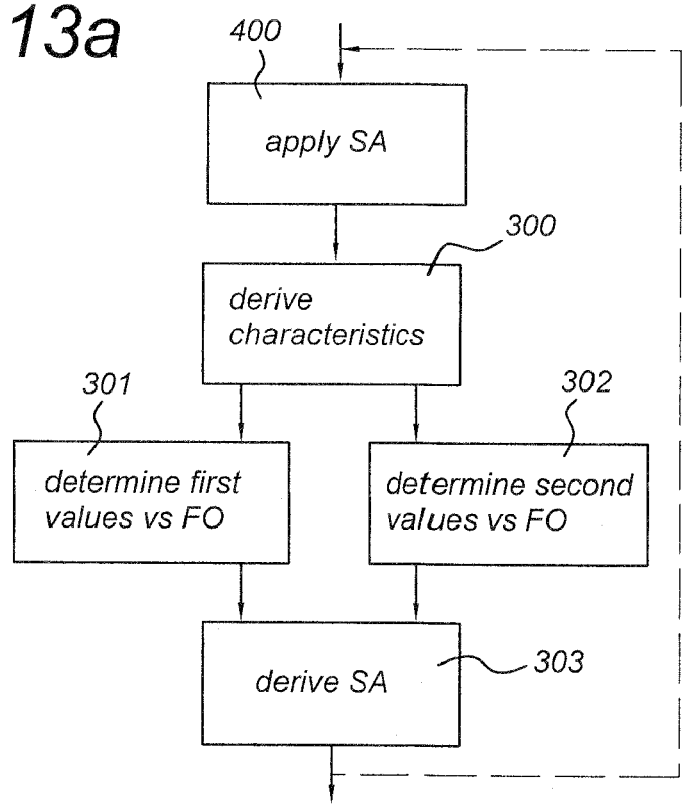
Figure 13B:
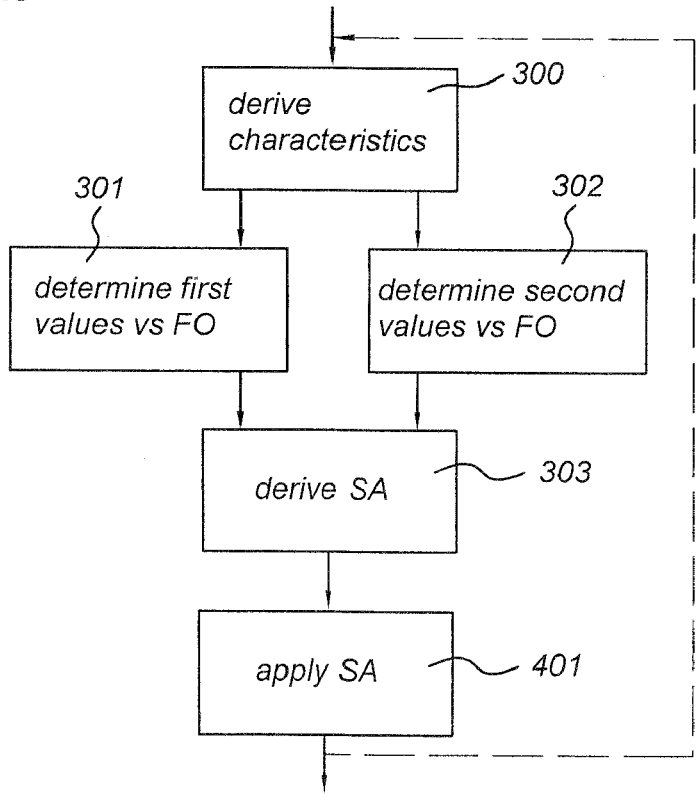
Figure 14:
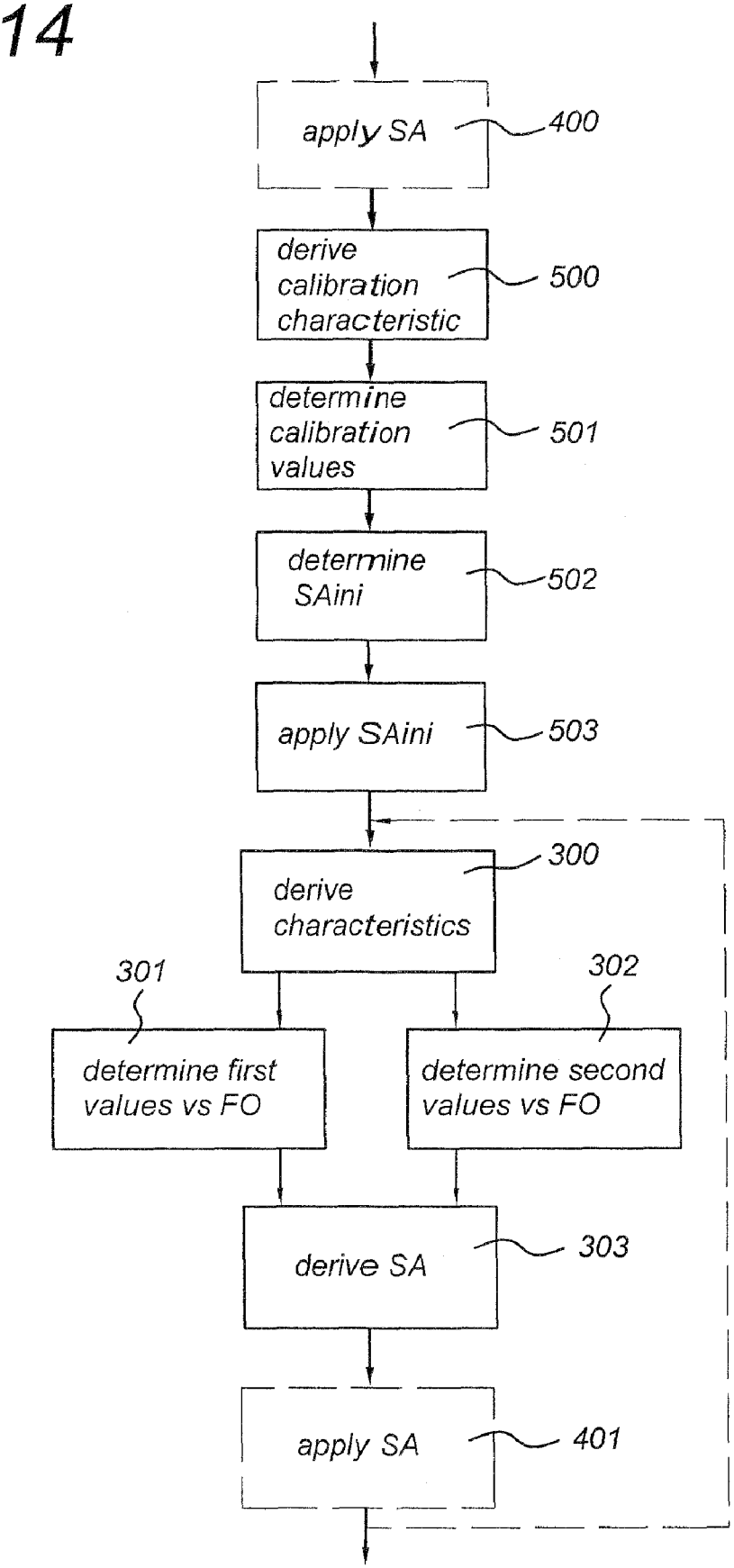
Figure 15:
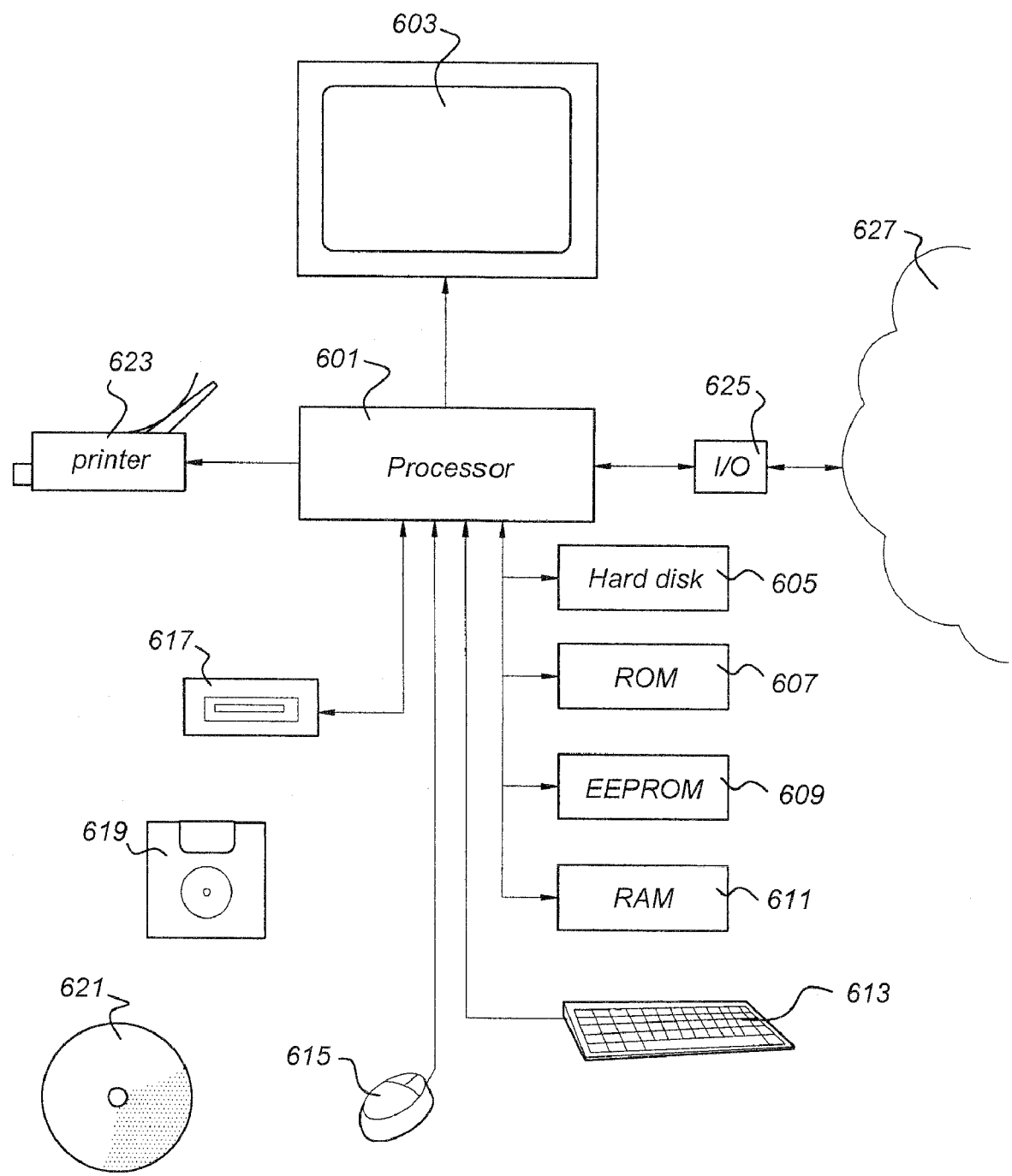

FIG. 2 schematically shows a wobbled groove and recorded information marks in the grooves on an optical disk;

FIG. 3 schematically shows an optical disk drive;

FIG. 4 schematically shows a signal processing unit of an optical disk drive;

FIG. 5 schematically shows a controller of an optical disk drive;

FIG. 6a shows a measurement of jitter as a function of focus offset and spherical aberration correction;

FIG. 6b shows a measurement of wobble amplitude as a function of focus offset and spherical aberration correction;

FIG. 6c shows a measurement of push-pull amplitude as a function of focus offset and spherical aberration correction;

FIG. 7 shows a measurement of jitter and push-pull as a function of focus offset at an initial spherical aberration correction value;

FIG. 8a-8f show measurements of jitter and push-pull amplitude as a function of focus offset at an different spherical aberration correction values;

FIG. 9 show a measurement of the focus offset difference as a function of the applied spherical aberration correction values;

FIG. 10 schematically shows an embodiment of a start-up procedure according to the invention;

FIG. 11 schematically shows an embodiment of a method according to the invention;

FIG. 12-14 schematically shows embodiments of further methods according to the invention;

FIG. 15 shows an overview of a computer arrangement that can be used to carry out the method according to the invention.

DETAILED DESCRIPTION

Figure 1A:
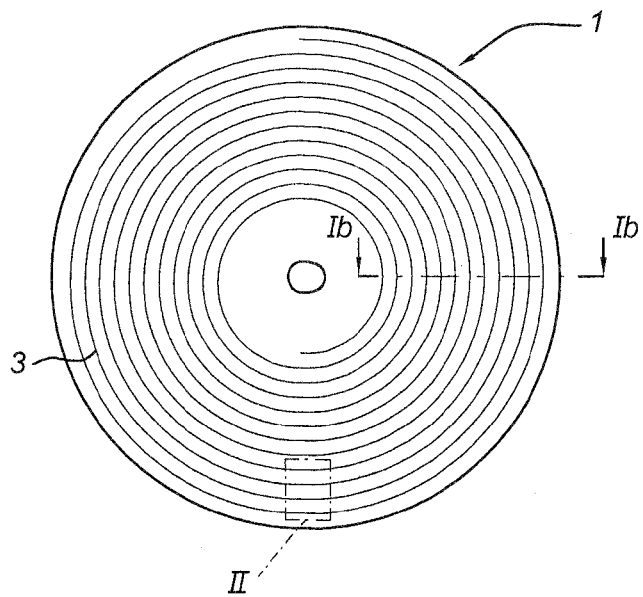
FIG. 1b shows a cross section an optical disk with one recording layer.
FIG. 1c shows a cross section an optical disk with two recording layers.
Figure 1B:
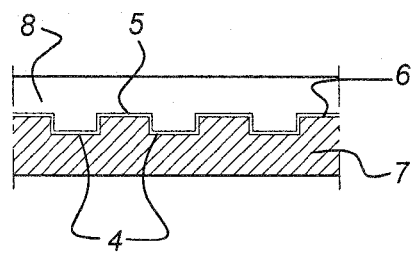
Figure 1C:
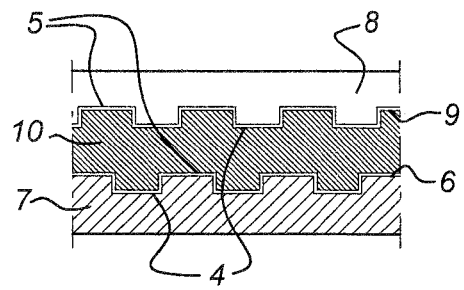

FIG. 1a-c show an optical disk 1 and FIG. 2 shows a detailed view of area II of the optical disk 1. The optical disk has a substantially circular, spiraling track 3. The track 3 is a groove 4 in a surrounding surface area 5, also called land. A recording layer 6 is deposited on the substrate 7. The recording layer is covered with a transparent cover layer 8. In a BluRay disk (BD), the transparent cover layer has a nominal thickness of 0.100 mm, and access of the tracks is done through this transparent cover layer. In a DVD disk, access is done through the substrate 7, which has a thickness of 0.6 mm.

A BluRay disk may alternatively comprise a flat substrate 7, with the track 3 being replicated in or on the cover layer 8 and the recording layer 6 being deposited in the cover layer 8. The cover layer 8 can, e.g., be a foil sheet, which is glued to the substrate 7.

The optical disk 1 may have a single recording layer 6 as shown in FIG. 1b. The optical disk 1 may also have multiple recording layers 6, 9, separated by a transparent spacer layer 10 as shown in FIG. 1c. In a BluRay disk, the spacer layer 10 usually has a thickness in the range of 0.020 mm-0.030 mm.

Although the nominal thickness of the cover layer for BD, the nominal thickness of the substrate for DVD and the spacer layer thickness for BD and for DVD are standardized, the actual and/or effective thickness of a specific optical disk and/or to a specific layer in a specific disk can deviate significantly from the nominal thickness. A deviation in thickness results in spherical aberration of the focussed spot 21 (cf. FIG. 3) when the disk is being scanned by an optical disk drive. This causes the size of the spot to increase, thus deteriorating the spot quality. For a robust operation, an optical disk drive therefore preferably has a provision to correct for thickness variations.

The disk is thus produced as a disk with empty tracks 12, as is shown in FIG. 2. The track can accommodate marks 14 which can be written on the track with an optical disk drive. These marks can be erased and overwritten in, e.g., a rewritable BluRay disk (BD-RE disk), but can also be of a permanent nature as in a recordable BluRay disk (BD-R disk). The marks are of different lengths, and carry data information. These marks can be read out with a disk drive, as these marks result in a modulation of light reflected on the disk, which is detected by the disk drive with a sensor.

As shown in FIG. 2, the track 3 may have a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a centre frequency encoding or a phase-modulated sinusoidal with a modulation at a fixed frequency. Various standardized optical disk systems use the wobble for carrying information to classify the disk and the values of various parameters, e.g., the address of a specific location on the disk. Disks according to the DVD+RW, BD-RE and BD-R standards have a phase-modulated wobble at a fixed spatial period measured along the track. Disks according to the DVD-RW standard have a frequency-modulated wobble.

The track 3 may also comprise portions where the continuous groove 4 is preceded or interrupted by a series of embossed pits, so-called header marks (not shown). The header marks may carry information to classify the disk and the values of various parameters, alternatively or additionally to the information in the wobble. Alternatively or additionally, the continuous land portion 5 may also be interrupted by embossed pits (not shown), so-called land pre-pits, as, e.g., in disks according to the DVD-R standard. Alternatively or additionally, embossed pits may also be positioned in between the groove 4 and the land portion 5, as, e.g., in disks according toe the DVD-RAM standard.

FIG. 3 shows an optical disk drive. The optical disk 1 rotates about an axis 22 operated by a motor 23. A laser diode 15 generates an incident optical beam 11, which is directed onto the optical disk via a beam splitter 16, a collimator 17 and an objective lens 18. The beam splitter 16 steers the beam over a 90 degree angle. The collimator 17 produces a substantially parallel incident beam 11a, which is focused by the objective lens 18 into a focussing spot 21 on the track 3. The disk is rotated about the axis 22 by a motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. A spherical aberration correction actuator 19 can move the collimator lens 17 parallel to its optical axis in order to adjust the convergence of the beam 11a when the thickness of the transparent cover layer 7 of a BluRay disk deviates from its nominal 0.100 mm. When the optical thickness of the cover layer 7 is smaller than the nominal value, the collimator lens 17 is moved towards the objective lens 18 to produce a somewhat more convergent beam 11a. When this beam is focussed on the optical disk, the difference in spherical aberration originating from the different cover layer thickness is compensated for. Likewise, the difference in spherical aberration originating from the spacer layer can also be compensated for when focussing on the different layers of a multi-layer disk. When the thickness is larger, the collimator lens 17 is moved away from the objective lens 18 to produce a somewhat more divergent beam 11a. Also various alternative methods for spherical aberration correction may be used, such as an actuated liquid crystal lens, an actuated telescope or an actuated dual-objective lens design. A control unit 20 controls the actuators 24, 28 and 19 to keep the optimal positions for the objective lens and the collimator position while the disk is rotating. The optical disk reflects the incident beam. The reflected beam 25 is separated from the incident beam by the beam splitter 16. An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27. The entire optical system is fitted onto a single support so as to constitute an integrally moveable optical head 38. The movement of the optical head is performed by a head motor 29.

As is shown in detail in FIG. 4, the sensor may be a quadruple photodetector 26, having four sensor segments 26A-26D for sensing the intensities of four portions of the reflected beam 25. The sensor signal comprises four channels, A-D, one for each sensor segment. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a data signal HF=A+B+C+D, a radial tracking error signal or radial push-pull signal PP=(A+B)−(C+D) and, for an astigmatic focussing method, a focus error signal FE=(A+C)−(B+D). The error signal may be of this form, but may also be normalized, with a normalized radial push-pull signal NPP=((A+B)−(C+D))/(A+B+C+D) and a normalized focus error signal NFE=((A−B)/(A+B))+((C−D)/(C+D)). Another focussing method may alternatively be used, such as the spot-size method or the Foucault method, with a corresponding focus error signal FE.

FIG. 5 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The data signal HF is passed to a data recovery mechanism HFPR. The data recovery mechanism HFPR retrieves the data as recorded with the marks 14 on the optical disk 1. The data recovery mechanism HFPR may use a clock recovery circuit comprising a phase-lock loop and a signal detection circuit. The signal detection unit may, e.g., use a so-called slicer to decide on the value of the digital data by comparing the data signal HF with a threshold at the recovered clock moments. The signal detection unit may alternatively be equipped with a partial-response-maximum likelihood (PRML) detection scheme. The data recovery mechanism HFPR may also be equipped to measure a quality of the signal as recorded by the marks 14 and a reliability of the data recovery. Measures used commonly in the art include measures known as jitter, asymmetry, modulation depth, bit error rate, signal-to-noise ratio (SNR), partial-response signal-to-noise ratio (PRSNR), Sequenced Amplitude Margin (SAM). The recovered data is then further processed to obtain so-called user data by an error correction circuit (ECC), which will not be further described here.

The radial push-pull signal PP (or NPP) is passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal substantially has a predetermined value, also called tracking offset. This tracking offset is usually zero. The tracking controller RAD may also be equipped to measure a quality of the radial error signal. Measures used commonly in the art include a push-pull signal amplitude and a track-cross signal amplitude.

The focus error signal FE (or NFE) is passed to a focus controller FOC. Arrow 32 represents the capability of the focus controller FOC to control the focus actuator 24, so as to keep the focussing spot 21 focussed at the correct depth in the track 3. For this purpose, the focus controller FOC controls the focus actuator 24 such that the focus error signal has a predetermined value, also called focus offset.

Arrow 33 denotes the capability of a laser driver controller LDIC to control the laser diode 15, for example to modulate a current through the laser diode 15 in order to write data onto the optical disk 1.

Arrow 34 denotes the capability of a spherical aberration correction controller SPH to control the spherical aberration correction actuator 19. The spherical aberration correction actuator 19 drives a spherical aberration correction element. In this exemplary embodiment, the spherical aberration correction actuator 19 drives the position of a collimator lens 17 in order to apply a correction to the incident beam 11 in order to correct thickness variations of the cover layer 7, as was described with reference to FIG. 3.

Arrow 35 denotes the capability of a disk motor controller MOT to control the motor 23. A speed of the motor 23 may be adjusted, e.g., to scan the optical disk 1 with a well-defined linear speed or a well-defined angular speed.

The radial push-pull signal PP (or NPP) is also passed to a wobble processor WOB. When scanning the track, the amplitude radial push-pull signal PP shows a variation as a function of time as a result of the wobble on the disk. This variation is also commonly referred to as the wobble signal WS. The wobble processor WOB may generate a digital wobble data signal WDAT from the wobble signal WS. The digital wobble data signal WDAT may further be processed by a digital processor SYSCON, in order to retrieve so-called wobble data coded in the wobble. The wobble data may, e.g., comprise the physical address of the location on the disk, laser power parameters for writing marks, disk information such as the disk manufacturer. The use of the wobble data will not be further described here. The wobble processor WOB may also retrieve a frequency corresponding to the spatial frequency of the wobble on the disk 1 from the wobble signal WS. When writing marks 14 on the disk by modulating the laser diode 15 with the laser driver controller LDIC, the frequency may be used to derive a disk speed and a write clock in order to have a well-defined time-base for the writing process. The wobble processor WOB may also be equipped to measure a quality of the wobble signal WS. Measures used commonly in the art include wobble amplitude, wobble signal-to-noise ratio (wSNR), wobble error rate.

The digital processor SYSCON may also provide and monitor information, such as control settings, via control lines SYSHCON, SYSRCON, SYSFCON, SYSLCON, SYSSCON, SYSWCON, SYSMCON to and from the data recovery mechanism HFPR, the radial tracking controller RAD, the focus controller FOC, the laser driver controller LDIC, the spherical aberration correction controller SPH, the wobble processor WOB and the disk motor controller MOT. The focus controller FOC may, e.g., receive a focus offset value FO via control line SYSFCON in order to apply a focus offset to the focus actuator and hence to move the objective lens towards or away from the disk. Likewise, the spherical aberration correction controller SPH may receive a spherical aberration correction value SA via control line SYSSCON in order to drive the spherical aberration correction actuator 19 to apply a correction to the spherical aberration correction element 17 and hence a apply spherical aberration correction to the focussed spot 21. The digital processor SYSCON may also interface via 79 to external components, e.g., a host computer in which the optical disk drive is mounted.

The control unit CON is arranged for aiming to scan the track 3 on the optical disk 1 with an optimal quality of the spot 21. For this purpose, the digital processor SYSCON can, e.g., retrieve the measurement value of push-pull signal amplitude from the radial tracking controller RAD, the measurement value of jitter from the data recovery mechanism HFPR, and the measurement value of wobble amplitude from the wobble processor WOB. By comparing a selection of these measurement values as a function of one or more operating parameters of the various controllers, the digital processor SYSCON may generate optimal values for the operating parameters. E.g., by comparing and analysing the measurement values of jitter as a function of the applied focus offset and the applied spherical aberration correction value, the digital processor SYSCON may try to generate an optimal focus offset and an optimal spherical aberration correction value.

FIG. 6a-6c show two-dimensional measurements of various characteristics as a function of focus offset (FO) and spherical aberration correction (SA). The applied spherical aberration correction is shown along the horizontal axis in arbitrary units denoting the collimator lens position. The applied focus offset is shown along the vertical axis in arbitrary units denoting the objective lens position. The value of the characteristic is shown as contour lines in arbitrary units.

FIG. 6a shows the measurement of jitter as a function of focus offset and spherical aberration correction. A smooth behaviour of jitter as a function of both parameters is observed with a minimum along a slanted line J1-J2. The jitter values only vary slowly when moving along this line. The measurement may be fitted reasonably with a smooth function.

FIG. 6b shows the measurement of wobble amplitude as a function of focus offset and spherical aberration correction. A smooth behaviour of wobble amplitude as a function of both parameters is observed with a maximum along a vertical line W1-W2. The measurement may be fitted well with a smooth function.

FIG. 6c shows the measurement of push-pull amplitude as a function of focus offset and spherical aberration correction. The measurement shows roughly a maximum along a slanted line P1-P2. However, the measurement can not be fitted well with a smooth function.

By comparing the lines of minimum jitter J1-J2 and maximum push-pull amplitude P1-P2, it can be observed that the line of minimum jitter J1-J2 and the line of maximum push-pull amplitude P1-P2 have an intersection point. This intersection corresponds to the condition where focus offset and spherical aberration correction are such that optimum data detection can be done at optimal tracking stability. However, the difficulty in fitting the measurement of the push-pull amplitude hampers a reliable determination of the lines of maximum push-pull, and another measurement is required to find this optimum.

It should be noted that alternative image quality measures may be used without departing from the scope of the invention. For example, a person skilled in the art may use a track-cross signal amplitude, wobble amplitude or an alternative radial error signal quality measure as an alternative to push-pull amplitude. An asymmetry, modulation depth, bit error rate, signal-to-noise ratio (SNR), signal-to-noise ratio (SNR), partial-response signal-to-noise ratio (PRSNR), Sequenced Amplitude Margin (SAM) or an alternative data quality measure may be used as an alternative to jitter. Several preferred, but non-exhaustive, alternatives are mentioned in the dependent claims. We will describe a detailed embodiment using push-pull amplitude, jitter and wobble signal amplitude.

An initial estimate of the required spherical aberration correction and focus offset can be obtained from the two-dimensional measurement of wobble amplitude, the so-called pre-calibration based on a 2D-wobble optimization. A two-parameter function can be fitted to the measurement to obtain the initial estimates, i.e., an initial spherical aberration correction SAini and an initial focus offset FOini. Unfortunately, it was found that these initial estimates do not always coincide perfectly with the jitter optimum or with the push-pull amplitude optimum. The 2D-wobble optimization is thus acceptable as starting point, but further optimization is required to guarantee that the system will have stable tracking and good read/write performance.

FIG. 7 shows a measurement of push-pull amplitude 100 and jitter 110 as a function of focus offset at this initial spherical aberration correction value, i.e., at the initial position of the collimator lens. A plurality of focus offset values is applied to the focus actuator. For each focus offset value, a value of the push-pull amplitude 1001-1013 is measured and/or a jitter value 1101-1119 is measured. The measurement of push-pull amplitude as a unction of focus offset gives a curve with a maximum between point 1006 and 1007 at a first focus offset FO1ini. The measurement of jitter as a function of focus offset gives a curve with a minimum between point 1110 and 1111 at a second focus offset FO2ini. The focus offset FO1ini corresponding to maximum push-pull amplitude is different from the focus offset FO2ini corresponding to minimum jitter. In this example, there is a difference of about 2000 arbitrary units between both optima. This is an unacceptably large difference. The use of the focus offset FO1ini corresponding to maximum push-pull amplitude would result in an increase of about 2% points of jitter compared to the optimum. The use of the focus offset FO2ini corresponding to minimum jitter would result in a decrease of 10-15% of push-pull amplitude compared to the optimum, and hence in a decreased robustness of the tracking performance.

Figure 8A:
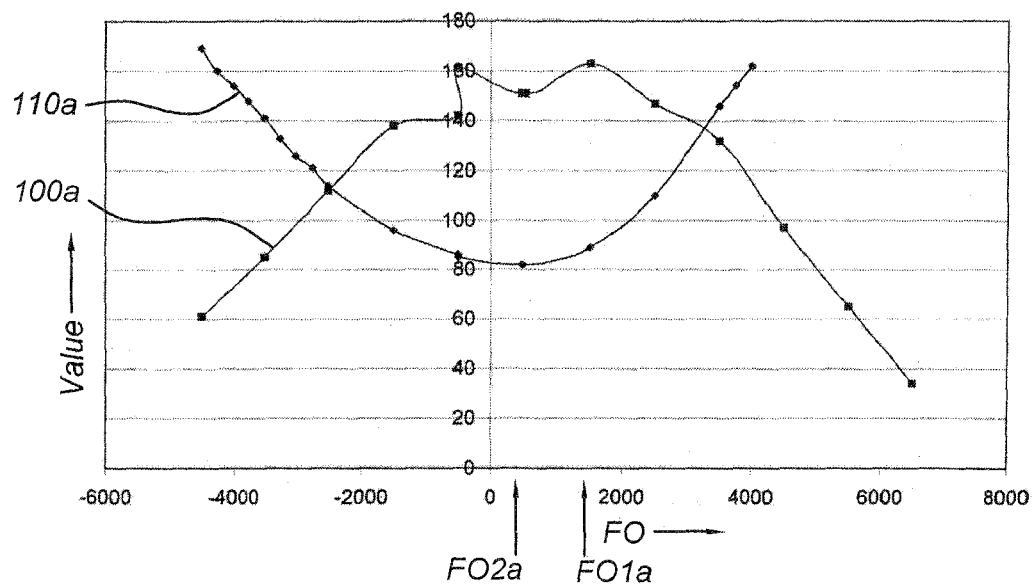
Figure 8B:
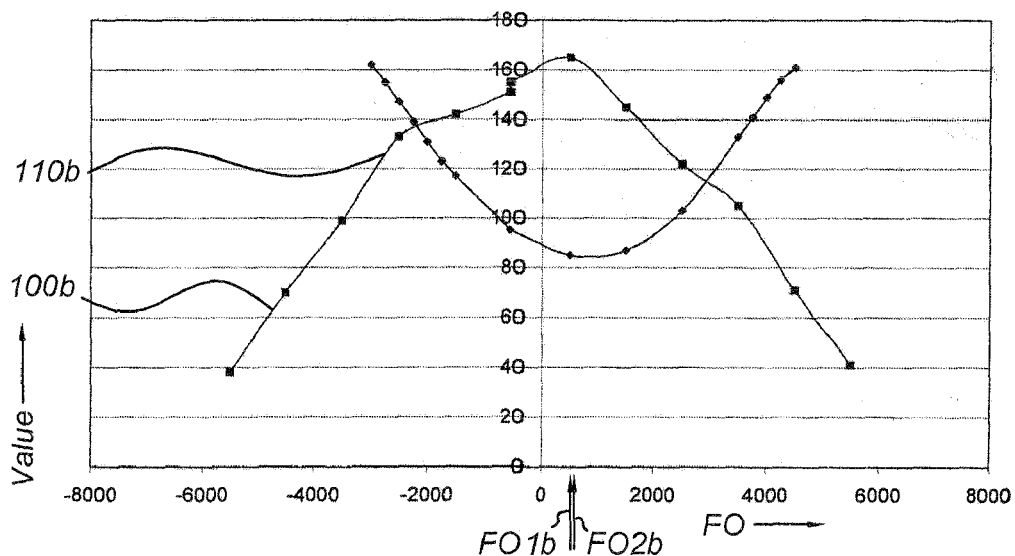
Figure 8C:
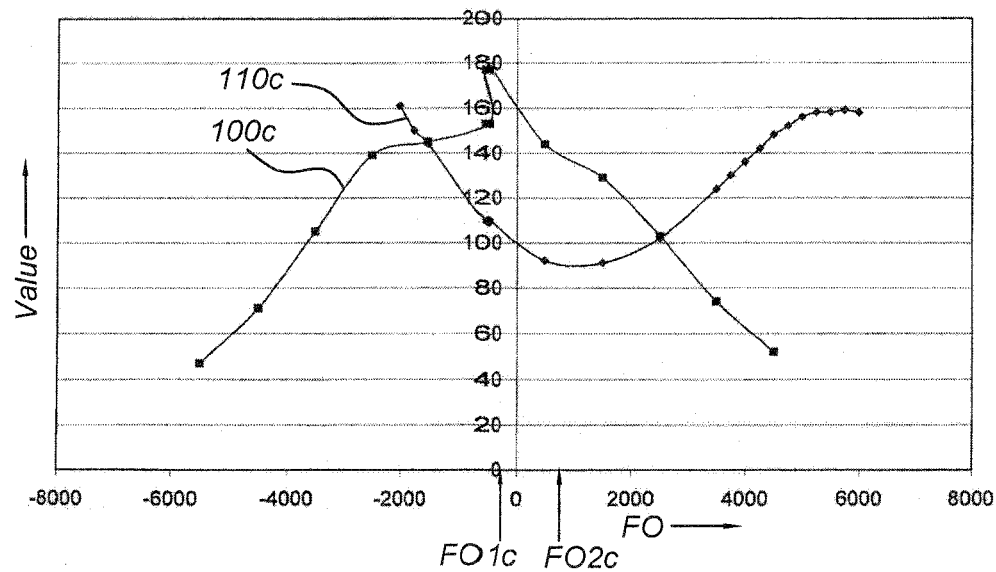
Figure 8D:
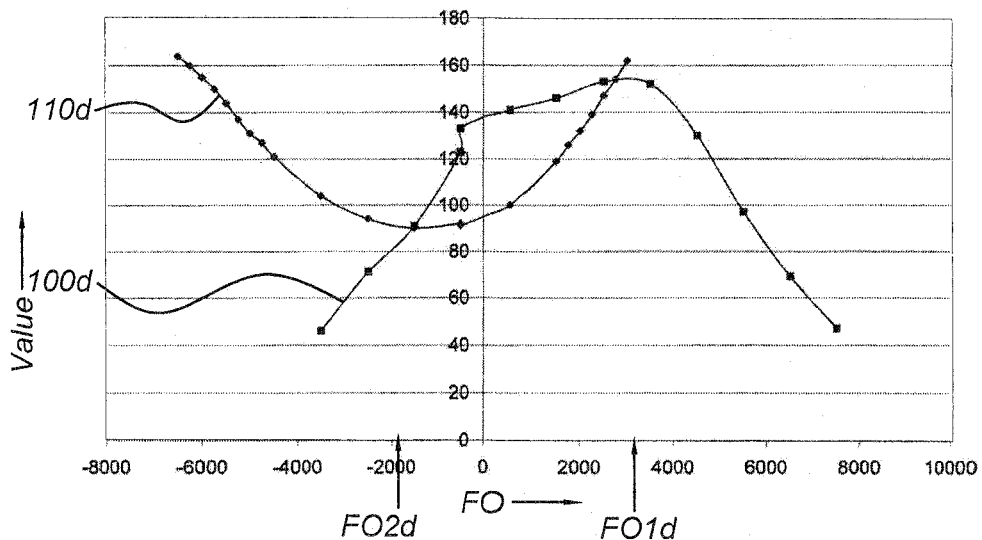
Figure 8E:
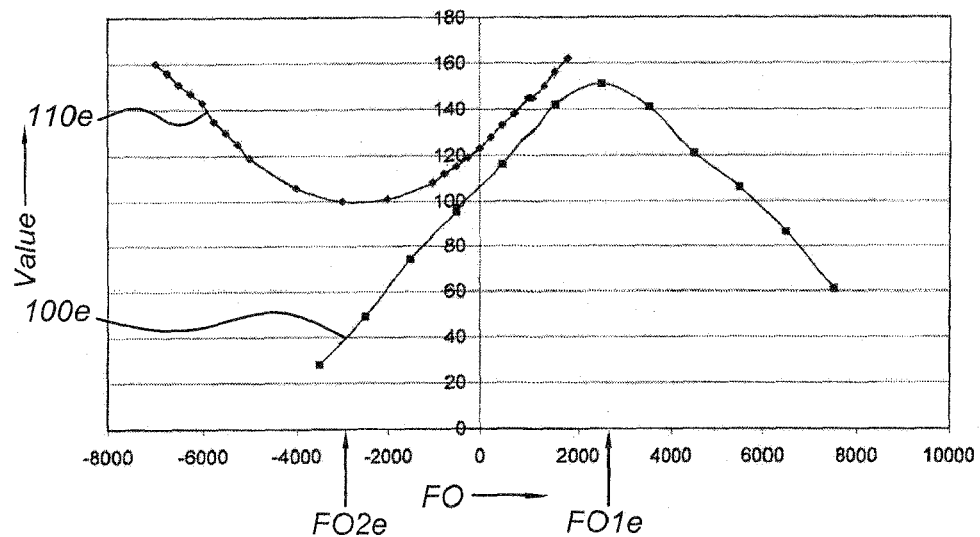
Figure 8F:
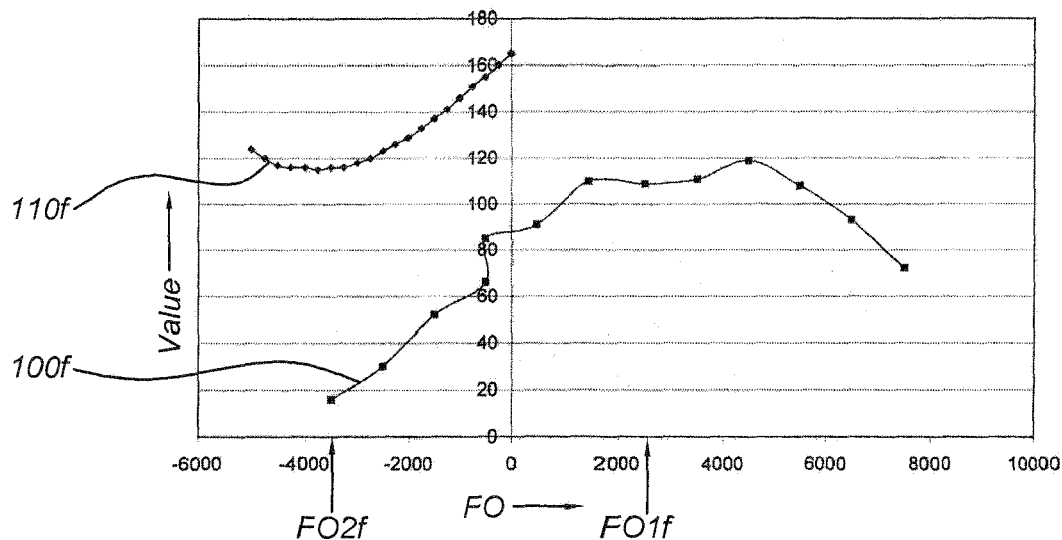

FIG. 8a-8f show measurements of push-pull amplitude and jitter as a function of focus offset at different spherical aberration correction values, i.e., at different positions of the collimator lens. FIG. 8a shows a measurement of push-pull amplitude 100a and jitter 110a as a function of focus offset at a collimator position of −100 arbitrary units relative to the initial position of the collimator lens; FIG. 8b shows a measurement of push-pull amplitude 100b and jitter 110b as a function of focus offset at a collimator position of −200 arbitrary units; FIG. 8c shows a measurement at a collimator position of −300 arbitrary units; FIG. 8d shows a measurement at a collimator position of +100 arbitrary units; FIG. 8e shows a measurement at a collimator position of +200 arbitrary units; and FIG. 8f shows a measurement at a collimator position of +300 arbitrary units.

For each measurement, a first focus offset value FO1a-FO1f and a second focus offset value FO2a-FO2f are determined as the focus offset value corresponding to maximum push-pull amplitude and the focus offset value corresponding to minimum jitter respectively. It can be observed that the focus offset value FO1 corresponding to maximum push-pull amplitude and the focus offset value FO2 corresponding to minimum jitter move in opposite direction as a function of collimator position. The condition where maximum push-pull amplitude and minimum jitter are measured at the same, or closest, focus offset value is the required condition, i.e., the condition of FIG. 8a at a focus offset value of approximately 300 arbitrary units. It can also be observed from the measurements that the value of the maximum push-pull amplitude and the value of minimum jitter are approximately the same for the collimator positions in a reasonably wide range about the required position. Hence, when using the required position, there is no significant increase of jitter or decrease of push-pull amplitude when using this procedure, in contrast to the situation described in reference to FIG. 7. However, to acquire such a plurality of measurements will require too much start-up time, as each one-dimensional measurement cost more than one second while the whole procedure shall preferably be finished within only a few seconds.

The insight underlying this invention is that it is not required to acquire such a plurality of measurements, but that a single measurement can be used. The basis for this insight is FIG. 9, showing a measurement of a focus offset difference along the vertical axis as a function of the applied collimator position on the horizontal axis. For each collimator position corresponding to the measurements shown in FIG. 7 and FIG. 8a-8f, a focus offset difference $\Delta$FO is determined from the difference between the focus offset value FO2 corresponding to minimum jitter and focus offset value FO1 corresponding to maximum push-pull amplitude. I.e., an initial focus offset difference $\Delta$FOini is determined as $\Delta$FOini=FO2ini−FO1ini, and for each collimator position a focus offset difference $\Delta$FOx is determined as $\Delta$FOx=FO2x−FO1x for each x=a, ..., f. The focus offset differences $\Delta$FOini and $\Delta$FOx, x=a, ..., f, are drawn as a function of the collimator position relative to the initial position.

The measurement is shown for four different optical disk drives, A, B, C and D, of the same type as measurements 120A, 120B, 120C and 120D. The focus offset difference is observed to correlate well with the applied collimator position. The correlation is also observed to be approximately the same for different optical disk drives of the same type. It is thus possible to derive a required collimator position from the obtained focus offset difference by using the found correlation: only a single one-dimensional measurement of push-pull amplitude and jitter as a function of focus offset at one spherical aberration correction value suffices to obtain a required collimator position.

In the example, the curves for four different optical disk drives, A, B, C and D, of the same type can be approximated by linear curves corresponding to the formulas:

| | |
|---|---|
| Y = −12.00 X − 2736 | for curve 130A for optical disk drive A, |
| Y = −12.56 X + 272 | for curve 130B for optical disk drive B, |
| Y = −12.96 X − 1057 | for curve 130C for optical disk drive C, |
| Y = −11.99 X + 193 | for curve 130D for optical disk drive D, | with X being the change in collimator position, and Y the focus offset difference. These curves, or more particularly their slopes, can be averaged to obtain:

$Y=-12.5X.$

Inverting this formula to obtain the required change in collimator position for compensating the spherical aberration results in:

$X=Y/12.5.$

The step size may be chosen a little bit more conservative because the offset is not always the same for each optical disk drive, and iterating the procedure while cumulating the obtained spherical aberration corrections. E.g., the step size and direction may be set to ⅔ of the theoretical value:

$$X = \frac{2}{3} * (Y/12.5).$$

Iterating the above procedure until the obtained focus offset difference is below a certain threshold then results in a reliable end result.

The full start-up procedure is described with reference to FIG. 10. FIG. 10 shows a first block 200 in which a 2D-wobble optimization is performed to obtain an initial focus offset FOini and an initial spherical aberration correction value SAini. In the next block 201, laser power levels are obtained in order to be able to write marks with a good quality on the disk. The laser power levels may be obtained from information retrieved from the disk, e.g., from data stored in the wobble or on the land on the optical disk, or data stored in a embossed pits or another type of marks in a dedicated area, e.g., a so-called lead-in or a lead-out area, of the disk. Also a laser power calibration may be done to obtain optimized laser power levels. Three adjacent tracks are then written with the laser power levels in a test area on the optical disk. In the next block 202, a one-dimensional measurement of push-pull amplitude and a one-dimensional measurement of jitter are done as a function of focus offset, at the initial spherical aberration correction value. The measurement is done in the middle track of the three adjacent track to include cross-talk from the outer tracks in the jitter measurement. A first optimal focus offset FO1 is derived from the one-dimensional measurement of push-pull amplitude as a function of focus offset, i.e., the focus offset at which the push-pull amplitude is maximal. A second optimal focus offset FO2 is derived from the one-dimensional measurement of jitter as a function of focus offset, i.e., the focus offset at which the jitter is minimal. These optima may be extracted from a comparison of the measurement values and picking the focus offset at which the measurement value is minimum or maximum respectively. The optima may also be extracted from fitting a function to the measurements and deriving the focus offset at which the function has its minimum or maximum value respectively. The difference ΔFO between the second optimal focus offset FO2 and the first optimal focus offset FO1 is calculated. In block 203, a decision is made in dependence on the value of the difference ΔFO. When the difference ΔFO is within a predetermined difference range, e.g., if the difference is in between −500 and +500 arbitrary units, then the procedure jumps to a further block 207, which will be described below, and the initial spherical aberration correction will be used by the drive in further actions on this disk. When the difference ΔFO is outside the predetermined difference range, a new spherical aberration correction value SA is calculated in block 204. The new spherical aberration correction value SA is the sum of the applied spherical aberration correction value and a spherical aberration correction value SAcor derived from the predetermined function, $$SAcor = fSphC(\Delta FO) = \frac{2}{3} * (\Delta FO/12.5).$$

In block 205, the one-dimensional measurement of push-pull amplitude and the one-dimensional measurement of jitter as a function of focus offset are repeated, while applying the new spherical aberration correction value to the movable collimator. Again the first optimal focus offset FO1 and second optimal focus offset FO2 are derived, and the difference ΔFO is calculated. In block 206, a decision is made in dependence on the value of the difference ΔFO and the first and second optimal focus offset. The procedure will iterate from block 204 when the difference ΔFO is outside the predetermined difference range, or when the first optimal focus offset is outside a predetermined focus offset range, or when the second optimal focus offset is outside the predetermined focus offset range. The procedure will iterate maximum three times. When the procedure does not iterate, the procedure continues at block 207. In block 207, a third optical focus offset FO3 may be obtained from a weighted average of the first and the second optimal focus offset. In block 207, also a laser power calibration may be done to obtain optimized laser power level at the obtained focus offset and spherical aberration correction value in a test area on the optical disk. In the next block 208, the optical disk drive may record data on the disk while applying the obtained focus offset and obtained spherical aberration correction value. In block 208, the obtained spherical aberration correction value may be applied for all radial positions on the disk, and will only be determined again when another disk is received by the optical disk drive or when the optical disk drives switches to another layer of a multi-layer disk. The obtained focus offset may be adjusted based on a local optimization at, e.g., other radial positions or when the disk is operated at a later moment in time. The local optimization may be done by determining a local optimal focus offset from a single one-dimensional measurement of, e.g., jitter as a function of focus offset or, e.g., wobble signal amplitude as a function of focus offset. Applying the local optimal will also largely account for the possible difference in layer thickness and the resulting difference in spherical aberration at another location on the disk.

FIG. 1 shows a block diagram of a method according to the invention. In a first action 300, a first and a second characteristic are derived from the sensor signal 40. E.g., the push-pull signal amplitude of the radial error signal and the jitter of the data signal are derived. In a second action 301, push-pull signal amplitude values are determined for a plurality of focus offset values. In a third action 302, in parallel to or sequential to the second action 301, jitter values are determined for a plurality of focus offset values. In a fourth action 303, a spherical aberration correction value is derived from the push-pull amplitude values determined in action 301 and the jitter values determined in action 302.

FIG. 12 shows a block diagram of a detailed embodiment of action 303. In a first action 304, a first optimal focus offset FO1 is determined at which the first characteristic is optimal. E.g., a first optimal focus offset FO1 is determined at which the push-pull signal amplitude has its maximum value. In a second action 305, a second optimal focus offset FO2 is determined at which the second characteristic is optimal. E.g., a second optimal focus offset FO2 is determined at which the jitter has its minimum value. In a third action 306, the focus offset difference ΔFO=FO2−FO1 is determined and the spherical aberration correction value is obtained from a pre-determined function fSphC(ΔFO). The function may be a linear function fsphC(ΔFO)=α·ΔFO+β, with α being a constant, e.g., determined during a factory calibration of the drive, and β typically zero.

FIG. 13a shows a block diagram of a farther method according to the invention. An action 400 is performed prior to action 300. In action 400, a spherical aberration correction value is applied to the spherical aberration correction actuator. This allows to perform the method shown in FIG. 11 or FIG. 12 while applying a spherical aberration correction during actions 300, 301, 302. This correction may, e.g., be derived from the layer number of the layer of the optical disk that is being scanned. In a two-layer disk for example, it is known that the layer closest to the entrance surface is at a nominal cover layer thickness of 0.070 mm to 0.080 mm, whereas the other layer is at a nominal layer thickness of 0.100 mm, consisting of the cover layer thickness and the spacer thickness. The 0.020 mm to 0.030 mm thickness difference can be approximately compensated for with action 400. The dashed line indicates that the method may optionally repeat actions 400, 300, 301, 302, 303 in one or more iterations.

FIG. 13b shows a block diagram of an alternative further method according to the invention. An action 401 is performed after action 303. In action 401, a spherical aberration correction value is applied to the spherical aberration correction actuator. This allows to apply a spherical aberration correction value obtained from the actions 300, 301, 302, 303 from the method shown in FIG. 11 or FIG. 12. Further scanning of the optical disk will thus be done while the derived spherical aberration correction value is applied to the spherical aberration correction actuator, i.e., with an improved spot quality. The dashed line indicates that the method may optionally repeat actions 300, 301, 302, 303, 401 in one or more iterations.

FIG. 14 shows a block diagram of a further method according to the invention. Prior to action 300, a pre-calibration comprising four actions 500, 501, 502, 503 is performed. In a first action 500, a calibration characteristic is derived from the sensor signal 40. E.g., a wobble signal amplitude is derived. In a second action 501, wobble signal amplitude values are determined for a plurality of spherical aberration correction values and focus offset values. In a third action 502, an initial spherical aberration correction value and an initial optimal focus offset are determined at which the first characteristic is optimal, e.g., when the wobble amplitude is largest. In a fourth action 503, the initial spherical aberration correction value is applied to the spherical aberration correction actuator. Action 300, 301, 302 are then performed while applying the initial spherical aberration correction from the pre-calibration. Optionally, action 400 may be applied before action 500, and/or action 401 may be applied after action 303. The dashed line indicates that the method may optionally repeat actions 300, 301, 302, 303, 401 in one or more iterations.

In FIG. 15, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. In the claims, any reference signs placed between parentheses shall not be construed as limiting the claim.

The invention claimed is:

1. An optical disk drive for scanning an optical disk, the optical disk drive comprising:
   an optical source for generating an incident beam;
   an objective lens arranged to be driven by a focus actuator with a focus offset;
   a sensor for sensing a reflected beam produced by the optical disk upon receiving the incident beam, and for producing a sensor output signal;
   a processor arranged to:
      receive the sensor output signal from the sensor,
      derive at least a first and a second characteristic from the sensor output signal, the second characteristic being different from the first characteristic,
      determine first values of the first characteristic as a function of a plurality of values of the focus offset,
      determine second values of the second characteristic as a function of a plurality of values of the focus offset,
      determine from the first values a first optimal focus offset at which the first characteristic is optimal,
      determine from the second values a second optimal focus offset at which the second characteristic is optimal,
      obtain a first spherical aberration correction value from a pre-determined function,
      repeat the determination of the first optimal focus offset and the determination of the second optimal focus offset when the first spherical aberration correction value is applied to a spherical aberration correction actuator,
      obtain a second spherical aberration correction value from said pre-determined function, and
   a spherical aberration correction controller arranged to apply the second spherical aberration correction value to the spherical aberration correction actuator.

2. An optical disk drive for scanning an optical disk, the optical disk drive comprising:
   an optical source for generating an incident beam;
   an objective lens arranged to be driven by a focus actuator with a focus offset;

a sensor for sensing a reflected beam produced by the optical disk upon receiving the incident beam, and for producing a sensor output signal; and a processor arranged to receive the sensor output signal from the sensor, derive at least a first and a second characteristic from the sensor output signal, the second characteristic being different from the first characteristic, determine first values of the first characteristic as a function of a plurality of values of the focus offset, determine second values of the second characteristic as a function of a plurality of values of the focus offset, determine from the first values a first optimal focus offset at which the first characteristic is optimal, determine from the second values a second optimal focus offset at which the second characteristic is optimal, select a third optimal focus offset from a range between the first optimal focus offset and the second optimal focus offset, and the focus actuator is arranged to drive the objective lens with the third optimal focus offset.

3. The optical disk drive according to claim 2, wherein the third optimal focus offset is determined as a weighted average of the first optimal focus offset and the second optimal focus offset.

4. An optical disk drive for scanning an optical disk, the optical disk drive comprising:

an optical source for generating an incident beam;

an objective lens arranged to be driven by a focus actuator with a focus offset;

a sensor for sensing a reflected beam produced by the optical disk upon receiving the incident beam, and for producing a sensor output signal; and a processor arranged to:

receive the sensor output signal from the sensor, derive at least a first and a second characteristic from the sensor output signal, the second characteristic being different from the first characteristic, determine first values of the first characteristic as a function of a plurality of values of the focus offset, determine second values of the second characteristic as a function of a plurality of values of the focus offset, derive from the first values of the first characteristic and the second values of the second characteristic a first spherical aberration correction value, wherein the focus actuator is arranged to drive the objective lens with the focus offset in dependence on an actual condition, such as the position on the disk and the temperature.

5. The optical disk drive according to claim 4, wherein:

the processor is arranged to:

derive a third characteristic from said sensor output signal, determine third values of the third characteristic as a function of a plurality of values of the focus offset, determine from said third values a local optimal focus offset at which the third characteristic is optimal, the focus actuator is arranged to drive the objective lens with the local optimal focus offset.

6. An optical disk drive for scanning an optical disk comprising a substantially circular track, the optical disk drive comprising:

an optical source for generating an incident beam;

an objective lens arranged to be driven by a focus actuator with a focus offset;

a sensor for sensing a reflected beam produced by the optical disk upon receiving the incident beam, and for producing a sensor output signal;

a processor arranged to:

derive a calibration characteristic from said sensor output signal, determine calibration values of the calibration characteristic as a function of a plurality of spherical aberration correction values and a plurality of values of the focus offset, determine from said calibration values an initial spherical aberration correction value and an initial focus offset at which the calibration characteristic is optimal, and a spherical aberration correction controller arranged to apply the initial spherical aberration correction value to a spherical aberration correction actuator.

7. The optical disk drive according to claim 6, wherein:

the processor is further arranged to:

write data onto a portion of the track when the initial spherical aberration correction value is applied to the spherical aberration correction actuator and the focus actuator is arranged to drive the objective lens with the initial focus offset, use said portion of the track in order to determine the first values of the first characteristic and the second values of the second characteristic, which are used to derive the first spherical aberration correction value.

8. An optical disk drive for scanning an optical disk, the optical disk drive comprising:

an optical source for generating an incident beam;

an objective lens arranged to be driven by a focus actuator with a focus offset;

a sensor for sensing a reflected beam produced by the optical disk upon receiving the incident beam, and for producing a sensor output signal;

a spherical aberration correction element arranged to be driven by a spherical aberration correction actuator with a spherical aberration correction value;

a processor arranged to:

receive the sensor output signal from the sensor, derive at least a first and a second characteristic from the sensor output signal, the second characteristic being different from the first characteristic, determine first values of the first characteristic as a function of a plurality of values of the focus offset, determine second values of the second characteristic as a function of a plurality of values of the focus offset, determine from the first values a first optimal focus offset at which the first characteristic is optimal, determine from the second values a second optimal focus offset at which the second characteristic is optimal, write new data onto the optical disk when the obtained spherical aberration correction value is applied to the spherical aberration correction actuator, if the processor measured at least one of the first characteristic and the second characteristic to be outside a limit, repeat the determination of the first optimal focus offset and the determination of the second optimal focus offset when the obtained spherical aberration correction value is applied to the spherical aberration correction actuator and using the newly written data, obtain a third spherical aberration correction value from a pre-determined function, and a spherical aberration correction controller arranged to apply the third spherical aberration correction value to the spherical aberration correction actuator.

9. An optical disk drive for scanning an optical disk, the optical disk drive comprising:
an optical source for generating an incident beam;
an objective lens arranged to be driven by a focus actuator with a focus offset;
a sensor for sensing a reflected beam produced by the optical disk upon receiving the incident beam, and for producing a sensor output signal;
a spherical aberration correction element arranged to be driven by a spherical aberration correction actuator with a spherical aberration correction value;
a processor arranged to:
receive the sensor output signal from the sensor,
derive at least a first and a second characteristic from the sensor output signal, the second characteristic being different from the first characteristic,
determine first values of the first characteristic as a function of a plurality of values of the focus offset,
determine second values of the second characteristic as a function of a plurality of values of the focus offset,
determine from the first values a first optimal focus offset at which the first characteristic is optimal,
determine from the second values a second optimal focus offset at which the second characteristic is optimal,
determine the number of layers of the optical disk in the optical disk drive and to select on which of the layers the incident beam is focused,
determine the first optimal focus offset and the second optimal focus offset on each of the layers of the optical disk separately,
obtain respective spherical aberration correction values for each of the layers individually from a pre-determined function, and
a spherical aberration correction controller arranged to apply the respective spherical aberration correction value to the spherical aberration correction actuator when the incident beam is focused on the corresponding layer.

10. The optical disk drive according to claim 9, wherein the first characteristic is a radial error signal characteristic.

11. The optical disk drive according to claim 10, wherein the first characteristic is a first signal quality of a radial error signal, the radial error signal being selected from a group of a push-pull signal, a wobble signal and a track-cross signal.

12. The optical disk drive according to claim 11, wherein the first characteristic is a first signal quality selected from a group of push-pull signal amplitude, a wobble signal amplitude and a track-cross signal amplitude.

13. The optical disk drive according to claim 9, wherein the second characteristic is a data signal characteristic.

14. The optical disk drive according to claim 13, wherein the second characteristic is a second signal quality of a data signal.

15. The optical disk drive according to claim 14, wherein the second characteristic is selected from a group of jitter, asymmetry, modulation, error rate, SNR, PRSNR and SAM.

16. The optical disk drive according to claim 5, wherein the third characteristic is a third signal quality of a data signal.

17. The optical disk drive according to claim 16, wherein the third characteristic is selected from a group of jitter, asymmetry, modulation, error rate, SNR, PRSNR and SAM.

18. The optical disk drive according to claim 6, wherein the calibration characteristic is a signal quality selected from the group of wobble amplitude, wobble error rate, push-pull amplitude, track-cross signal amplitude, data jitter, data error rate, data modulation depth, data SNR, data PRSNR, data SAM and disk reflectivity.

19. A method for deriving a spherical aberration correction value for use with an optical disk drive for scanning an optical disk comprising a substantially circular track, the optical disk drive comprising:
a optical source for generating an incident beam,
an objective lens arranged to be driven by a focus actuator with a focus offset, for focusing the incident beam onto said optical disk into a spot with a spherical aberration,
a sensor for sensing a reflected beam produced by said optical disk upon receiving said incident beam, and for producing a sensor output signal,
a processor arranged to receive said sensor output signal from said sensor,
wherein the method comprises:
deriving a calibration characteristic from the sensor output signal;
determining calibration values of the calibration characteristic as a function of a plurality of spherical aberration correction values and a plurality of values of the focus offset;
determining from said calibration values an initial spherical aberration correction value and an initial focus offset at which the calibration characteristic is optimal;
applying the spherical aberration correction value to the spherical aberration correction actuator arranged to drive a spherical aberration correction element for applying a correction to the incident beam for obtaining a spherical aberration correction to the spherical aberration of the spot;
applying the initial spherical aberration correction value to a spherical aberration correction actuator;
deriving a first and a second characteristic from said sensor output signal, the second characteristic being different from the first characteristic,
determining first values of the first characteristic as a function of a plurality of values of the focus offset,
determining second values of the second characteristic as a function of a plurality of values of the focus offset,
deriving from said first values of the first characteristic and said second values of the second characteristic the spherical aberration correction value.

20. The method according to claim 19, wherein, in order to derive the spherical aberration correction value, the method comprises:
determining from said first values a first optimal focus offset at which the first characteristic is optimal,
determining from said second values a second optimal focus offset at which the second characteristic is optimal,
obtaining the spherical aberration correction value from a pre-determined function,
the pre-determined function defining a spherical aberration correction value from a focus offset difference value,
the focus offset difference value determined from a difference between the second optimal focus offset and the first optimal focus offset.

* * * * *